(12) United States Patent
Brown Elliott

(10) Patent No.: US 7,307,646 B2
(45) Date of Patent: Dec. 11, 2007

(54) COLOR DISPLAY PIXEL ARRANGEMENTS AND ADDRESSING MEANS

(75) Inventor: Candice Hellen Brown Elliott, Vallejo, CA (US)

(73) Assignee: Clairvoyante, Inc, Sebastopol, CA (US)

( * ) Notice: Subject to any disclaimer, the term of this patent is extended or adjusted under 35 U.S.C. 154(b) by 421 days.

(21) Appl. No.: 10/047,995

(22) Filed: Jan. 14, 2002

(65) Prior Publication Data

US 2005/0104908 A1    May 19, 2005

Related U.S. Application Data

(60) Provisional application No. 60/301,088, filed on Jun. 25, 2001, provisional application No. 60/290,088, filed on May 9, 2001.

(51) Int. Cl.
G09G 5/02    (2006.01)

(52) U.S. Cl. ........................ 345/694; 345/698

(58) Field of Classification Search ............... 345/83, 345/81, 77, 86, 87, 98, 152, 136, 153, 204, 345/205, 206, 694, 695, 696, 697, 698, 214; 348/181–183, 219, 264, 790; 353/38, 31, 353/321; 382/321; 358/41, 44, 56

See application file for complete search history.

(56) References Cited

U.S. PATENT DOCUMENTS

| | | |
|---|---|---|
| 4,439,759 A | 3/1984 | Fleming et al. |
| 4,593,978 A | 6/1986 | Mourey et al. |
| 4,737,843 A | 4/1988 | Spencer |
| 4,946,259 A | 8/1990 | Matino et al. |
| 5,010,413 A | 4/1991 | Bahr |
| 5,062,057 A | 10/1991 | Blacken et al. |
| 5,189,404 A | 2/1993 | Masimo et al. |
| 5,196,924 A | 3/1993 | Lumelsky et al. |
| 5,233,385 A | 8/1993 | Sampsell |
| 5,291,102 A | 3/1994 | Washburn |
| 5,416,890 A | 5/1995 | Beretta |
| 5,436,747 A | 7/1995 | Suzuki |
| 5,438,649 A | 8/1995 | Ruetz |
| 5,448,652 A | 9/1995 | Vaidyanathan et al. |
| 5,450,216 A | 9/1995 | Kasson |
| 5,477,240 A | 12/1995 | Huebner et al. |

(Continued)

FOREIGN PATENT DOCUMENTS

DE    197 46 329 A1    3/1999

(Continued)

OTHER PUBLICATIONS

C. Elliott, "Reducing Pixel Count without Reducing Image Quality", *Information Display*, vol. 15, pp. 22-25, Dec. 1999.

(Continued)

*Primary Examiner*—Nitin I. Patel

(57) ABSTRACT

A method for forming a multipixel image on an imaging surface is disclosed. The method comprises projecting for each pixel in the multipixel image a plurality of beams of different colors towards the imaging surface. Each of the plurality of beams for each pixel is directed along a path towards the imaging surface, such that images formed on the imaging surface from each beam are convergent by substantially less than about 100%. An optical projector, a subtractive color flat panel display, and a CRT video display are also disclosed.

23 Claims, 17 Drawing Sheets

U.S. PATENT DOCUMENTS

| | | | |
|---|---|---|---|
| 5,485,293 | A | 1/1996 | Robinder |
| 5,642,176 | A | 6/1997 | Abukawa et al. |
| 5,648,793 | A | 7/1997 | Chen ........................ 345/96 |
| 5,689,283 | A * | 11/1997 | Shirochi ................. 345/698 |
| 5,719,639 | A | 2/1998 | Imamura |
| 5,724,442 | A | 3/1998 | Ogatsu et al. |
| 5,731,818 | A | 3/1998 | Wan et al. |
| 5,739,802 | A | 4/1998 | Mosier |
| 5,742,709 | A * | 4/1998 | Ueno et al. ............... 382/321 |
| 5,754,163 | A | 5/1998 | Kwon |
| 5,815,101 | A | 9/1998 | Fonte |
| 5,880,707 | A | 3/1999 | Aratani |
| 5,899,550 | A | 5/1999 | Masaki |
| 5,917,556 | A | 6/1999 | Katayama |
| 5,929,843 | A | 7/1999 | Tanioka |
| 5,933,253 | A | 8/1999 | Ito et al. |
| 5,971,546 | A * | 10/1999 | Park ........................ 353/38 |
| 6,054,832 | A | 4/2000 | Kunzman et al. |
| 6,064,363 | A | 5/2000 | Kwon ........................ 345/98 |
| 6,069,670 | A | 5/2000 | Borer |
| 6,115,081 | A * | 9/2000 | Hirata et al. ............. 348/744 |
| 6,151,001 | A | 11/2000 | Anderson et al. |
| 6,160,535 | A | 12/2000 | Park ........................ 345/153 |
| 6,225,967 | B1 | 5/2001 | Hebiguchi |
| 6,262,710 | B1 | 7/2001 | Smith |
| 6,278,434 | B1 | 8/2001 | Hill et al. |
| 6,297,826 | B1 | 10/2001 | Semba et al. |
| 6,326,981 | B1 | 12/2001 | Mori et al. |
| 6,348,929 | B1 | 2/2002 | Acharya et al. |
| 6,360,008 | B1 | 3/2002 | Suzuki et al. |
| 6,360,023 | B1 | 3/2002 | Betrisey et al. |
| 6,393,145 | B2 | 5/2002 | Betrisey et al. |
| 6,396,505 | B1 | 5/2002 | Lui et al. |
| 6,407,830 | B1 | 6/2002 | Keithley et al. |
| 6,414,719 | B1 | 7/2002 | Parikh |
| 6,441,867 | B1 | 8/2002 | Daly |
| 6,469,766 | B2 | 10/2002 | Waterman et al. |
| 6,483,518 | B1 | 11/2002 | Perry et al. |
| 6,509,904 | B1 | 1/2003 | Lam |
| 6,536,904 | B2 | 3/2003 | Kunzman |
| 6,538,742 | B1 | 3/2003 | Ohsawa |
| 6,570,584 | B1 | 5/2003 | Cok et al. |
| 6,600,468 | B1 * | 7/2003 | Kim et al. ................. 345/87 |
| 6,600,495 | B1 | 7/2003 | Boland et al. |
| 6,608,632 | B2 * | 8/2003 | Daly et al. ............... 345/698 |
| 6,624,828 | B1 | 9/2003 | Dresevic et al. |
| 6,661,429 | B1 | 12/2003 | Phan |
| 6,674,436 | B1 | 1/2004 | Dresevic et al. |
| 6,681,053 | B1 | 1/2004 | Zhu |
| 6,714,206 | B1 | 3/2004 | Martin et al. |
| 6,738,526 | B1 | 5/2004 | Betrisey et al. |
| 6,750,875 | B1 | 6/2004 | Keely, Jr. et al. |
| 6,781,626 | B1 | 8/2004 | Wang |
| 6,801,220 | B2 | 10/2004 | Greier et al. |
| 6,804,407 | B2 | 10/2004 | Weldy |
| 6,819,064 | B2 | 11/2004 | Nakanishi |
| 6,833,890 | B2 | 12/2004 | Hong et al. |
| 6,836,300 | B2 | 12/2004 | Choo et al. |
| 6,850,294 | B2 | 2/2005 | Roh et al. |
| 6,856,704 | B1 | 2/2005 | Gallagher et al. |
| 6,867,549 | B2 | 3/2005 | Cok et al. |
| 6,885,380 | B1 | 4/2005 | Primerano et al. |
| 6,888,604 | B2 | 5/2005 | Rho et al. |
| 6,897,876 | B2 | 5/2005 | Murdoch et al. |
| 6,903,378 | B2 | 6/2005 | Cok |
| 7,110,012 | B2 | 9/2006 | Messing et al. |
| 7,123,277 | B2 | 10/2006 | Brown Elliott et al. |
| 7,167,275 | B2 | 1/2007 | Fukasawa |
| 2001/0048764 | A1 | 12/2001 | Betrisey et al. |
| 2001/0052897 | A1 | 12/2001 | Nakano et al. |
| 2002/0012071 | A1 | 1/2002 | Sun |
| 2002/0093476 | A1 | 7/2002 | Hill et al. |
| 2002/0122160 | A1 | 9/2002 | Kunzman |
| 2002/0136293 | A1 * | 9/2002 | Washino ................ 375/240.01 |
| 2002/0149598 | A1 | 10/2002 | Greier et al. |
| 2002/0180745 | A1 * | 12/2002 | Matsuda et al. ............ 345/547 |
| 2002/0191130 | A1 | 12/2002 | Liang et al. |
| 2003/0034992 | A1 | 2/2003 | Brown Elliott et al. |
| 2003/0071826 | A1 | 4/2003 | Goertzen |
| 2003/0071943 | A1 | 4/2003 | Choo et al. |
| 2003/0214635 | A1 * | 11/2003 | Asakura et al. ............... 353/31 |
| 2003/0218618 | A1 | 11/2003 | Phan |
| 2004/0008208 | A1 | 1/2004 | Dresvic et al. |
| 2004/0021804 | A1 | 2/2004 | Hong et al. |
| 2004/0061710 | A1 | 4/2004 | Messing et al. |
| 2004/0085495 | A1 | 5/2004 | Roh et al. |
| 2004/0095521 | A1 | 5/2004 | Song et al. |
| 2004/0108818 | A1 | 6/2004 | Cok et al. |
| 2004/0114046 | A1 | 6/2004 | Lee et al. |
| 2004/0150651 | A1 | 8/2004 | Phan |
| 2004/0155895 | A1 | 8/2004 | Lai |
| 2004/0169807 | A1 | 9/2004 | Rho et al. |
| 2004/0179160 | A1 | 9/2004 | Rhee et al. |
| 2004/0189662 | A1 | 9/2004 | Frisken et al. |
| 2004/0189664 | A1 | 9/2004 | Frisken et al. |
| 2004/0232844 | A1 | 11/2004 | Brown Elliott |
| 2004/0233308 | A1 | 11/2004 | Elliott et al. |
| 2004/0239813 | A1 | 12/2004 | Klompenhouwer |
| 2004/0239837 | A1 | 12/2004 | Hong et al. |
| 2004/0263528 | A1 | 12/2004 | Murdoch et al. |
| 2005/0007539 | A1 | 1/2005 | Taguchi et al. |
| 2005/0024380 | A1 | 2/2005 | Lin et al. |
| 2005/0031199 | A1 | 2/2005 | Ben-Chorin et al. |
| 2005/0040760 | A1 | 2/2005 | Taguchi et al. |
| 2005/0068477 | A1 | 3/2005 | Shin et al. |
| 2005/0082990 | A1 | 4/2005 | Elliott |
| 2005/0083356 | A1 | 4/2005 | Roh et al. |
| 2005/0094871 | A1 | 5/2005 | Berns et al. |
| 2005/0099426 | A1 | 5/2005 | Promerano et al. |
| 2005/0140634 | A1 | 6/2005 | Takatori |
| 2005/0151752 | A1 | 7/2005 | Phan |
| 2005/0162600 | A1 | 7/2005 | Rho et al. |
| 2005/0169551 | A1 | 8/2005 | Messing et al. |

FOREIGN PATENT DOCUMENTS

| | | |
|---|---|---|
| DE | 299 09 537 U1 | 10/1999 |
| DE | 199 23 527 | 11/2000 |
| DE | 199 23 527 A1 | 11/2000 |
| DE | 201 09 354 U1 | 9/2001 |
| EP | 0 671 650 | 9/1995 |
| EP | 0 793 214 A1 | 9/1997 |
| EP | 0 878 969 | 11/1998 |
| EP | 0 899 604 A2 | 3/1999 |
| EP | 1 083 539 A2 | 3/2001 |
| JP | 03-78390 | 4/1991 |
| JP | 06-214250 * | 8/1994 |
| JP | 2002215082 A | 7/2002 |
| JP | 2004 078218 | 3/2004 |
| JP | 2004004822 | 8/2004 |
| WO | WO 00/21067 | 4/2000 |
| WO | WO 00/42564 | 7/2000 |
| WO | WO 00/42762 | 7/2000 |
| WO | WO 00/45365 | 8/2000 |
| WO | WO 00/65432 A2 | 11/2000 |
| WO | WO 00/67196 A1 | 11/2000 |
| WO | WO 01/10112 A2 | 2/2001 |
| WO | WO 01/52546 A2 | 7/2001 |
| WO | WO 02/059685 A2 | 8/2002 |
| WO | WO 03/050605 A1 | 2/2003 |
| WO | WO 03/056383 A1 | 7/2003 |
| WO | WO 2004/017129 A1 | 2/2004 |
| WO | WO 2004/021323 A2 | 3/2004 |
| WO | WO 2004/027503 A1 | 4/2004 |

| WO | WO 2004/040548 | 5/2004 |
| --- | --- | --- |
| WO | WO 2004/086128 A1 | 10/2004 |
| WO | WO 2005/050296 A1 | 6/2005 |

OTHER PUBLICATIONS

C. Elliott, "Active Matrix Display Layout Optimization for Sub-pixel Image Rendering", *IDMC 2000*, pp. 185-189, Aug. 2000.

H. Okumura, "A New Flicker-Reduction Drive Method for High-Resolution LCTVs", *SID '01 Digest*, pp. 551-554, 2001, no month.

C. Elliott, "New Pixel Layout for PenTile Matrix", *IDMC 2002*, pp. 115-117, Jan. 2002.

Lee, Baek-woon et al., "40.5L: Late-News Paper: TFT-LCD with RGBW Color System," *SID 03 Digest*, 2003, pp. 1212-1215.

Brown Elliott, C, "Co-Optimization of Color AMLCD Subpixel Architecture and Rendering Algorithms," SID 2002 Proceedings Paper, May 30, 2002.

Brown Elliott, C, "Development of the PenTile Matrix™ Color AMLCD Subpixel Architecture and Rendering Algorithms", SID 2003, Journal Article.

Brown Elliott, C, "New Pixel Layout for PenTile Matrix™ Architecture", IDMC 2002.

Brown Elliott, C, "Reducing Pixel Count Without Reducing Image Quality", Information Display Dec. 1999.

Krantz, John et al., Color Matrix Display Image Quality: The Effects of Luminance . . . SID 90 Digest.

messing, Dean et al., Improved Display Resolution of Subsampled Colour Images using Subpixel Addressing, IEEE ICIP 2002.

Messing, Dean et al., Subpixel Rendering on Non-Striped Colour Matrix Displays, 2003 International Conf on Image Processing, Sep. 2003, Barcelona, Spain.

Feigenblatt, Ron, "Remarks on Microsoft ClearType™", http://www.geocities.com/SiliconValley/Ridge/6664/ClearType.html, Dec. 5, 1998, Dec. 7, 1998, Dec. 12, 1999, Dec. 26, 1999, Dec. 30.

Wandell, Brian A., Stanford University, "Fundamentals of Vision: Behavior . . . ," Jun. 12, 1994, Society for Information Display (SID) Short Course S-2, Fairmont Hotel, San Jose.

Brown Elliott, C, "Pentile Matirx™ Displays and Drivers" ADEAC Proceedings Paper, Portland OR., Oct. 2005.

Non-Final Office Action, dated Feb. 7, 2005 in US Patent Publication No. 2003/0034992, (U.S. Appl. No. 10/051,612).

Response to Non-Final Office Action, dated Jul. 7, 2005 in US Patent Publication No. 2003/0034992, (U.S. Appl. No. 10/051,612).

Final Office Action, dated Aug. 31, 2005 in US Patent Publication No. 2003/0034992, (U.S. Appl. No. 10/051,612).

Response to Final Office Action, dated Sep. 19, 2005 in US Patent Publication No. 2003/0034992, (U.S. Appl. No. 10/051,612).

Non-Final Office Action, dated Dec. 15, 2005 in US Patent Publication No. 2003/0034992, (U.S. Appl. No. 10/051,612).

Response to Non-Final Office Action, dated Feb. 8, 2006 in US Patent Publication No. 2003/0034992, (U.S. Appl. No. 10/051,612).

Non-Final Office Action, dated Feb. 22, 2006 in US Patent Publication No. 2004/0232844, (U.S. Appl. No. 10/442,320).

Michiel A. Klompenhouwer, Gerard de Haan, Subpixel image scaling for color matrix displays, Journal of the Society for Information Display, vol. 11, Issue 1, Mar. 2003, pp. 99-108.

PCT International Search Report dated Jun. 3, 2002 for PCT/US02/12610 (U.S. Appl. No. 10/051,612).

PCT International Search Report dated Oct. 4, 2005 for PCT/US04/15911 (U.S. Appl. No. 10/442,320).

Felici, James, "ClearType, CoolType: The Eyes Have It," The Seybold Report on Internet Publishing, vol. 4, No. 8, Apr. 2000, available at http://www.syboldreports.com/SRIP/free/0408/cooltype.html.

Dipert, Brian, "Display technology's results are compelling, but legacy is un'clear'," EDN Magazine, Oct. 26, 2000, pp. 63-72.

Berry, John D., "Fuzzy Fonts," *Print*, May 2000 vol. 54, Issue 3, p. 38.

USPTO, Notice of Allowance, dated May 4, 2006 in US Patent No. 7,123,27 (U.S. Appl. No. 10/051,612).

Clairvoyante Inc, Response to Non-Final Office Action, dated Jun. 22, 2006 in US Patent Publication No. 2004/0232844 (U.S. Appl. No. 10/442,320).

USPTO, Final Office Action, dated Sep. 7, 2006 in US Patent Publication No. 2004/0232844 (U.S. Appl. No. 10/442,320).

Clairvoyante Inc, Response to Final Office Action, dated Jan. 19, 2007 in US Patent Publication No. 2004/0232844 (U.S. Appl. No. 10/442,320).

USPTO, Non-Final Office Action, dated Jun. 14, 2006 in US Patent Publication No. 2004/0233339 (U.S. Appl. No. 10/442,552).

Clairvoyante, Inc, Response to Non-Final Office Action dated Sep. 13, 2006 in US Patent Publication No. 2004/0233339 (U.S. Appl. No. 10/442,552).

USPTO, Notice of Allowance, dated Dec. 12, 2006 in US Patent Publication No. 2004/0233339 (U.S. Appl. No. 10/442,552).

\* cited by examiner

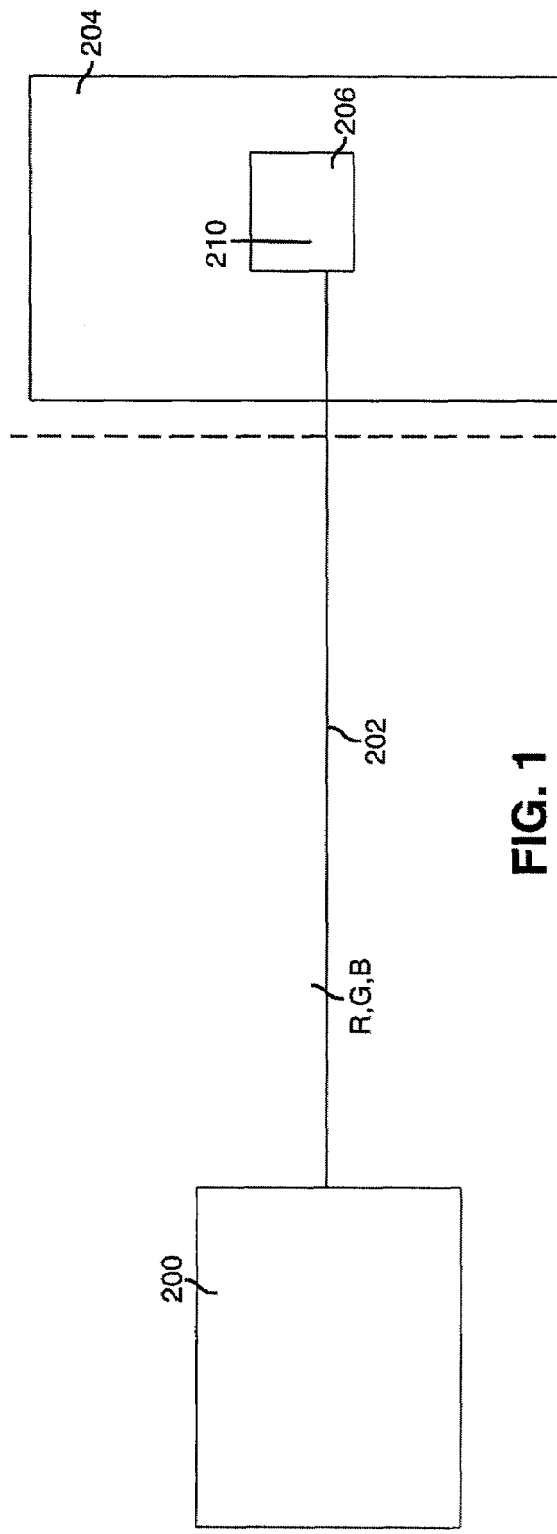
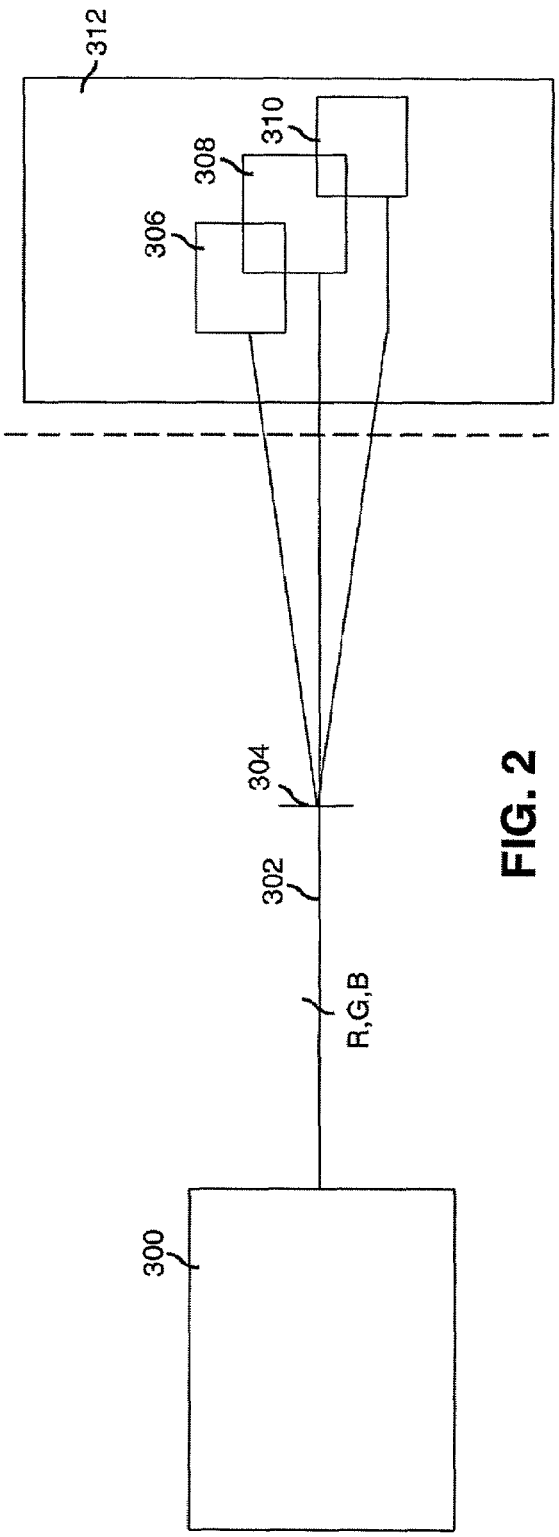
FIG. 1 PRIOR ART
FIG. 2

COLOR DISPLAY PIXEL ARRANGEMENTS AND ADDRESSING MEANS

SS-REFERENCE TO RELATED APPLICATION

The present application claims the benefit of the date of U.S. Provisional Patent Application Ser. No. 60/290,088, entitled "Pentile Matrix 3 Projector", filed on May 9, 2001 and of the date of U.S. Provisional Patent Application Ser. No. 60/301,088, entitled "Improvements to Color Display Pixel Arrangements and Addressing Means", filed on Jun. 25, 2001, which are incorporated by reference herein in their entirety.

BACKGROUND

The present application relates to improvements to display layouts and specifically to improved color pixel arrangements and means of addressing used in additive electronic projectors, subtractive flat panel displays, and Cathode Ray Tubes (CRT).

Graphic rendering techniques have been developed to improve the image quality of subpixelated flat panels. Benzschawel, et al. in U.S. Pat. No. 5,341,153 teach how to reduce an image of a larger size down to a smaller panel. In so doing, Benzschawel, et al. teach how to improve image quality using a technique now known in the art as "sub-pixel rendering". More recently Hill, et al. in U.S. Pat. No. 6,188,385 teach how to improve text quality by reducing a virtual image of text, one character at a time, using the very same sub-pixel rendering technique. In a provisional patent application filed by the same inventor, "CONVERSION OF RGB PIXEL FORMAT DATA TO PENTILE MATRIX PIXEL DATA FORMAT" (Ser. No. 60/290,086; Attorney Docket No. CLRV-003P), now U.S. Patent Publication No. 2003/0034992, hereby incorporated by reference, methods were disclosed to generate subpixel rendering filter kernels for improved display formats, including those formats disclosed herein. Prior art projectors, subtractive flat panel displays, and CRTs can not take advantage of such subpixel rendering.

The present state of the art color imaging matrix, for electronic projectors, subtractive color displays and CRT, use a simple orthogonal grid of square pixels aligned in columns and rows as illustrated in prior art FIG. 5. Image shifting to increase the effective resolution of electronic cameras is taught by Parulski et al. in U.S. Pat. No. 4,967,264, by Plummer et al. in U.S. Pat. No. 4,786,964, by Katoh et al. in U.S. Pat. No. 5,561,460, and by Yamada et al. in U.S. Pat. No. 5,754,226. Lower blue resolution for displays is taught by Sprague et al. in U.S. Pat. No. 5,315,418. These panels are a poor match to human vision.

Full color perception is produced in the eye by three-color receptor nerve cell types called cones. The three types are sensitive to different wavelengths of light: long, medium, and short ("red", "green", and "blue" respectively). The relative density of the three differs significantly from one another. There are slightly more red receptors than green. There are very few blue receptors compared to red or green.

The human vision system processes the information detected by the eye in several perceptual channels: luminance, chrominance, and motion. Motion is only important for flicker threshold to the imaging system designer. The luminance channel takes the input from only the red and green receptors. It is "color blind". It processes the information in such a manner that the contrast of edges is enhanced. The chrominance channel does not have edge contrast enhancement. Since the luminance channel uses and enhances every red and green receptor, the resolution of the luminance channel is several times higher than the chrominance channels. The blue receptor contribution to luminance perception is negligible. The luminance channel acts as a resolution band pass filter. Its peak response is at 35 cycles per degree (cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the diagonal axis is significantly lower.

The chrominance channel is further subdivided into two sub-channels, to allow us to see full color. These channels are quite different from the luminance channel, acting as low pass filters. One can always tell what color an object is, no matter how big it is in our field of view. The red/green chrominance sub-channel resolution limit is at 8 cycles/°, while the yellow/blue chrominance sub-channel resolution limit is at 4 cycles/°. Thus, the error introduced by lowering the blue resolution by one octave will be barely noticeable by the most perceptive viewer, if at all, as experiments at Xerox and NASA, Ames Research Center (R. Martin, J. Gille, J. Larimer, "Detectability of Reduced Blue Pixel Count in Projection Displays", SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color subpixels (or pixels or emitters) of a display to be perceived as the mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. This blending effect is directly related to the chrominance sub-channel resolution limits described above. Below the resolution limit, one sees separate colors, above the resolution limit, one sees the combined color.

An important aspect of electronic displays is resolution. There are three components of resolution in digitized and pixilated displays: bit depth, addressability, and Modulation Transfer Function (MTF). Bit depth refers to the number of displayable brightness or color levels at each pixel location in binary (base 2) power notation. Addressability refers to the number of independent locations that information may be presented and perceived by the human eye. Modulation Transfer Function refers to the number of simultaneously displayable lines and spaces that may be displayed and perceived by the human eye without color error. In display systems that are addressability-limited, the MTF is half of the addressability. However, MTF may be less than half the addressability, given the system design or limitations in the ability of the human eye to perceive the displayed resolution.

Examining the prior art display in FIG. 1, the design assumes that all three colors should have the same resolution. Additionally, the design assumes that the luminance information and the chrominance information should have the same spatial resolution, both in addressability and MTF. The human eye makes no such assumption.

Thus, the prior art arrangement of overlapping the three colors exactly coincidentally, with the same spatial resolution is shown to be a poor match to human vision.

SUMMARY

A method for forming a multipixel image on an imaging surface is disclosed. The method comprises projecting for each pixel in the multipixel image a plurality of monochrome beams of different colors towards the imaging surface. Each of the plurality of monochrome beams for each pixel is directed along a path towards the imaging surface, such that images formed on the imaging surface from each beam are convergent by substantially less than about 100%.

A method for forming a multipixel image on a projection screen is disclosed. The method comprises projecting for each pixel in the multipixel image a plurality of monochrome light beams of different colors towards the projection screen. Each of the plurality of monochrome light beams for each pixel is directed along a path towards the projection screen, such that images formed on the projection screen from each light beam are convergent by substantially less than about 100%.

A method for forming a multipixel image on a phosphor surface is disclosed. The method comprises projecting for each pixel in the multipixel image a plurality of electron beams that pass through aperture masks towards the phosphorous surface, each beam exciting substantially separate color emitting phosphors. Each of the plurality of monochrome electron beams for each pixel is directed along a path towards the phosphor surface, such that images formed on the phosphor surface from each electron beam are convergent by substantially less than about 100%.

An optical projector is also disclosed. The optical projector comprises a plurality of monochrome light beams of different colors. Each of the plurality of monochrome light beams for each pixel are directed along a path towards a projection screen. The images formed on the projection screen from each light beam are convergent by substantially less than about 100%.

A CRT video display is also disclosed. The CRT video display comprises a plurality of electron beams. Each of the plurality of electron beams for each pixel are directed along a path towards a phosphor surface. The images formed on the phosphor surface from each electron beam are convergent by substantially less than about 100%.

BRIEF DESCRIPTION OF THE DRAWINGS

Referring now to the figures, wherein like elements are numbered alike:

FIG. 1 illustrates a side view of a prior art projector projecting images, in a frontal view, to a central point on an imaging screen;

FIG. 2 illustrates a side view of a projector, projecting images, in a frontal view, to a central point on an imaging screen in which the three colors are offset by one-half pixel in the diagonal direction;

FIG. 10 illustrates the overlaid image of FIG. 9 with one full color logical pixel turned on;

FIGS. 11 and 12 illustrates the red and green image planes, respectively, with a single column of logical pixels turned on;

FIGS. 14 and 15 illustrates the red and green image planes, respectively, with two columns of logical pixels turned on;

FIG. 23 illustrates an overlay of FIG. 8 for three colors in which the colors are offset by one-third pixel each, with one full color logical pixel turned on.

DETAILED DESCRIPTION

Figure 3:
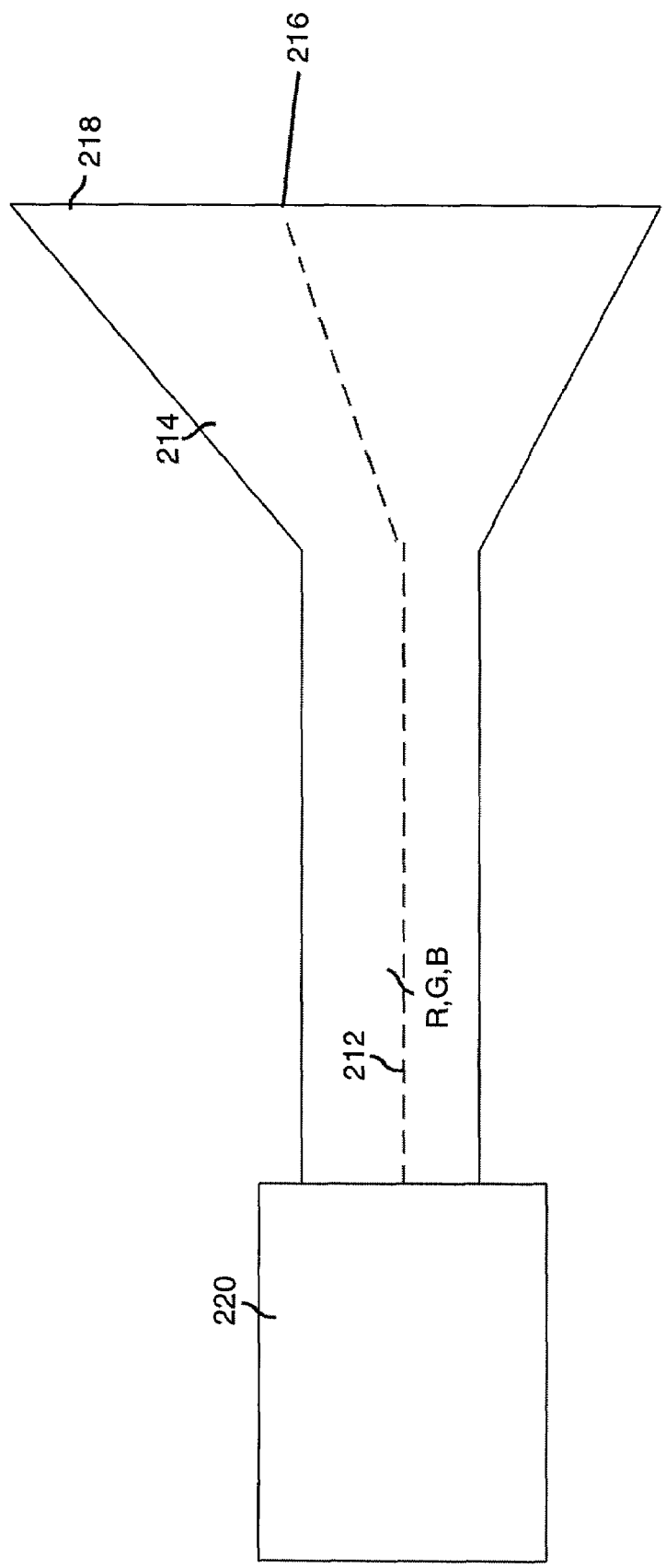
FIG. 3 illustrates a side view of a prior art CRT projecting images to a central point on an imaging screen.

Those of ordinary skill in the art will realize that the following description of the present invention is illustrative only and not in any way limiting. Other embodiments of the invention will readily suggest themselves to such skilled persons.

The prior art overlaps the three colors' images exactly coincidentally, with the same spatial resolution. Here, the color imaging planes are overlaid upon each other with an offset of about one-half pixel. By offsetting the color imaging planes, a display having higher resolution images is created by increasing the addressability of the system. Additionally, the Modulation Transfer Function (MTF) is increased to better match the design to human vision.

FIG. 1 is schematic of a prior art projector 200 having a light beam 202 that projects red (R), blue (B), and green (G) images 206 on to an imaging (or projection) screen 204. Prior art practices converge the red, the blue, and the green images to a point 210 on the projection screen 204. In contrast, an embodiment is illustrated in FIG. 2. FIG. 2 is schematic of a projector 300 having a light beam 302 that projects through an optical element (or lens) 304 red 306, blue 308, and green images 310 on to an imaging (or projection) screen 312. As illustrated in the figure, such an arrangement will separate and differentially shift the red, green and blue images due to the different index of refraction for each wavelength. Thus, the image is again formed, but the image is shifted optically to separate the red, blue, and green color planes by about one-half pixel.

Figure 3A:
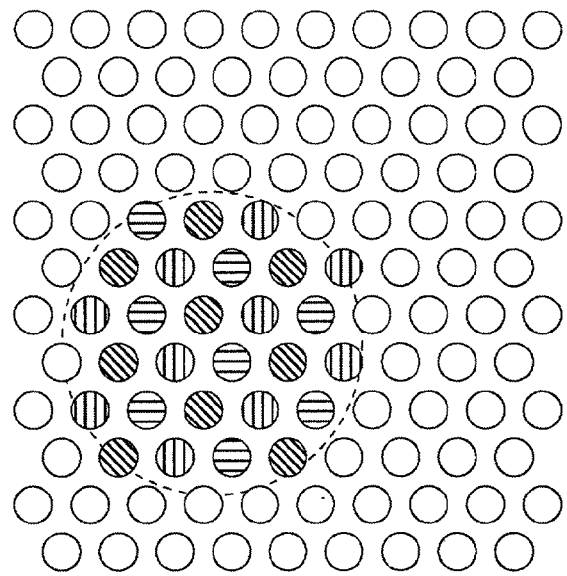
FIG. 3A illustrates a portion of the phosphor screen of the prior art CRT illustrated in FIG. 3, focusing Gaussian spots to a single point on an imaging screen.

A similar procedure is used with a Cathode Ray Tube (CRT) video display, as illustrated in prior art FIG. 3. An electron gun 220 projects an electron beam 212 inside the CRT 214 onto a phosphor surface 218 with an array of color primary emitting phosphor dots. Prior art practices converge the red, the blue, and the green images to a circular Gaussian spot 216 on the phosphor surface 218. The CRT 214 can direct the electron beam 212 towards the phosphor surface 218 electrostatically or magnetically. FIG. 3A illustrates a portion of the phosphor screen in which the CRT focuses Gaussian spot to a single point on the phosphor screen.

Figure 4A:
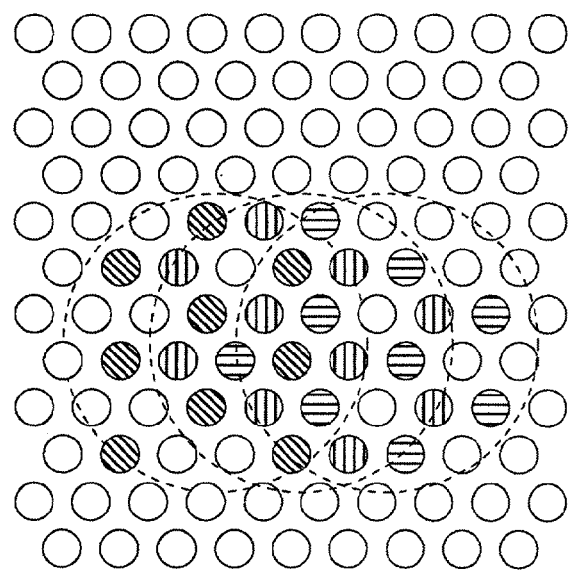
FIG. 4A illustrates a portion of the CRT illustrated in FIG. 4 focusing Gaussian spot to a phosphor screen in which the three color spots are offset by one-third pixel in the diagonal direction.
Figure 4B:
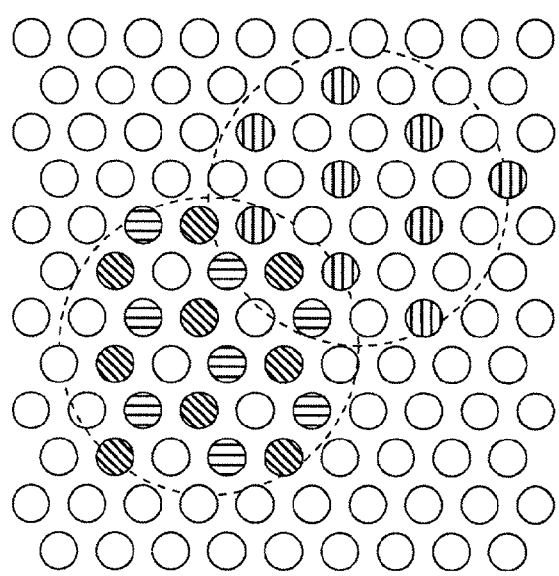
FIG. 4B illustrates a portion of the CRT illustrated in FIG. 4 focusing Gaussian spot to a phosphor screen in which the green color spots are offset by one-half pixel in the diagonal direction.
Figure 4:
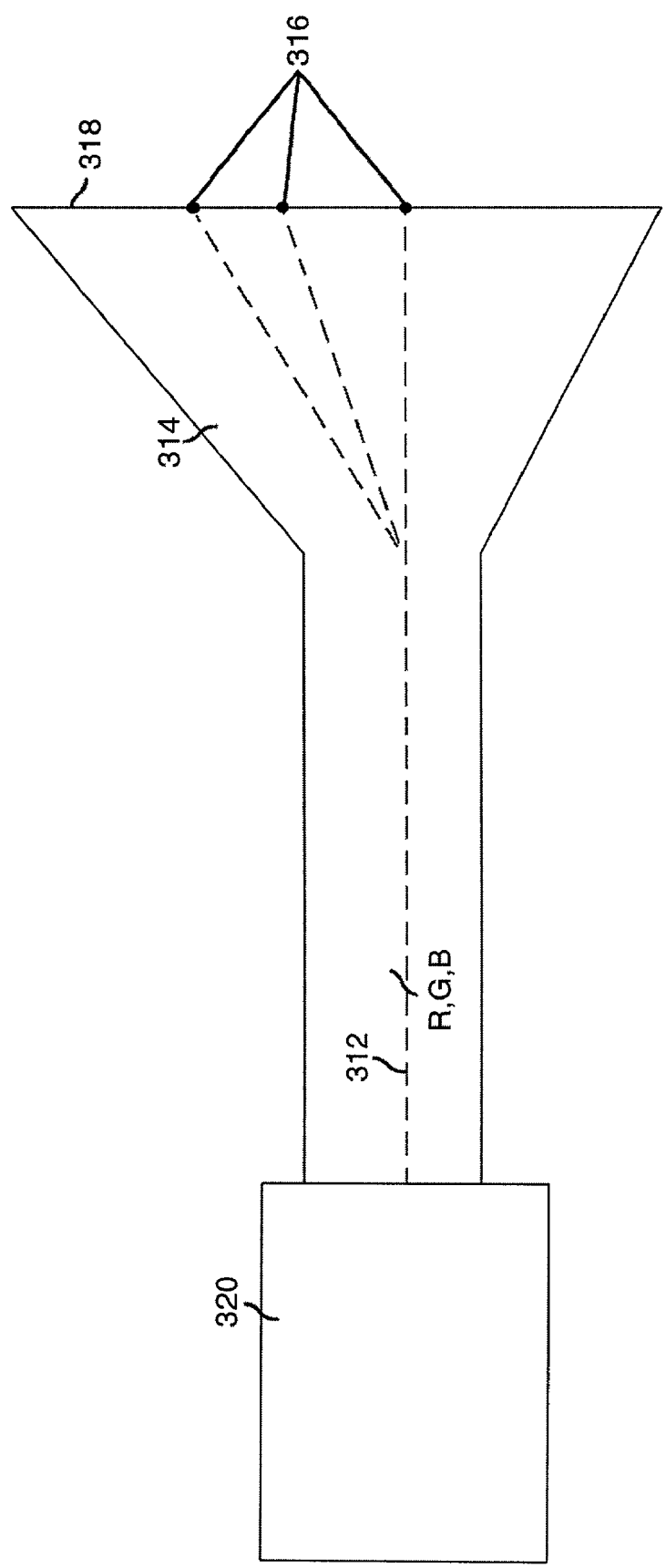
FIG. 4 illustrates a side view of a CRT projecting images to an imaging screen in which the three colors are offset by one-half pixel in the horizontal direction.

In contrast, another embodiment is illustrated in FIG. 4. FIG. 4 is schematic of a CRT video display having electron guns 320 that projects electron beams 312 inside the CRT 314 onto a phosphor surface 318. As illustrated in FIG. 4, such an arrangement will separate and differentially shift the red, green and blue images 316. This can be accomplished by misconverging the electron beams with steering electronics, such as yoke coils, electrostatic deflection plates, or by appropriately displacing the electron guns. Thus, the image is again formed, but the image is shifted to separate the red, blue, and green color planes by about one-third pixel or by shifting just the green color plane by one-half pixel. FIG. 4A illustrates the portion of the phosphor screen in which the CRT focuses Gaussian spot so that three color spots are offset by one-third pixel in the horizontal direction. This modification allows CRTs so adjusted to use the very same subpixel rendering techniques utilized in the art on conventional RGB stripe architecture liquid crystal display (LCD) panels. While FIG. 4B illustrates a portion of the phosphor screen in which the CRT focuses the Gaussian spots so that the green color spot is offset by one-half pixel in the diagonal direction. Contrary to the prior art projectors, prior art subtractive flat panels, or prior art CRT displays which are not subpixelated, the projectors, subtractive flat panel displays, or CRT displays discussed herein are subpixelated and may thus take advantage of subpixel rendering techniques.

Figure 5:
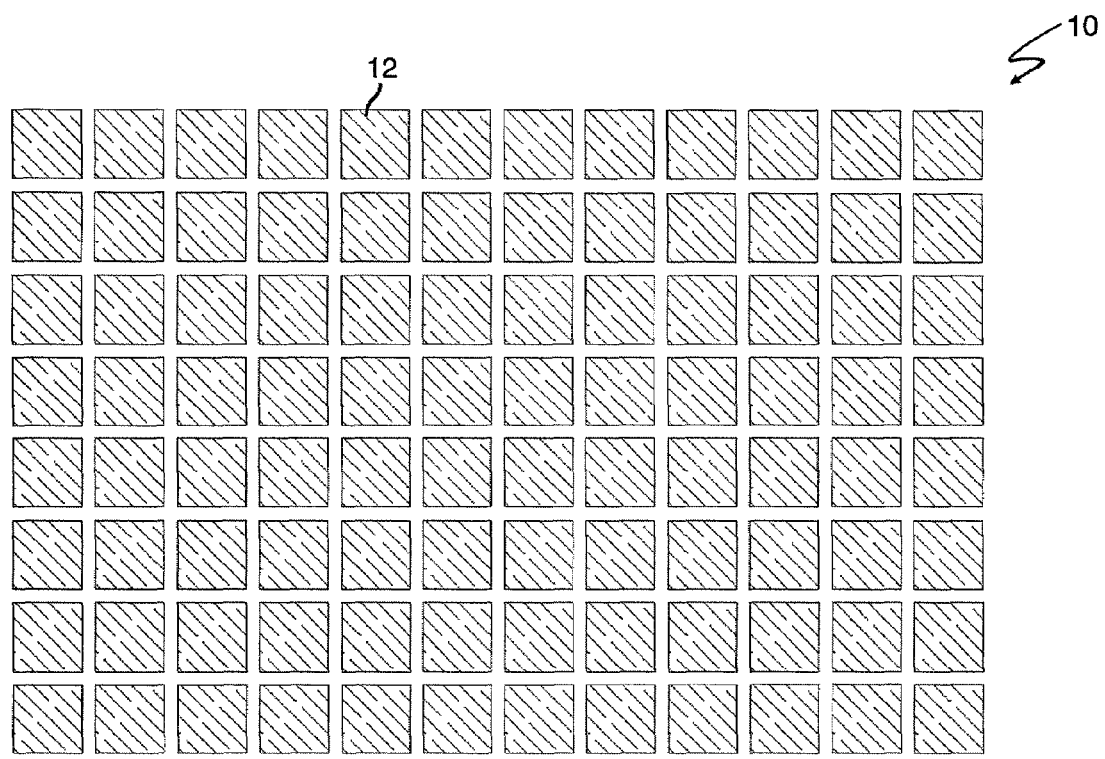
FIG. 5 illustrates a prior art arrangement of pixels for electronic information display projectors.

FIG. 5 is a prior art arrangement 10 of square pixels 12, forming an array of 12×8 pixels. For prior art projection or subtraction displays, three planes of 12×8 pixels would be overlaid to create a set of 12×8 logical pixels. This is a total of 96 pixels comprising 288 color elements.

Figure 6:
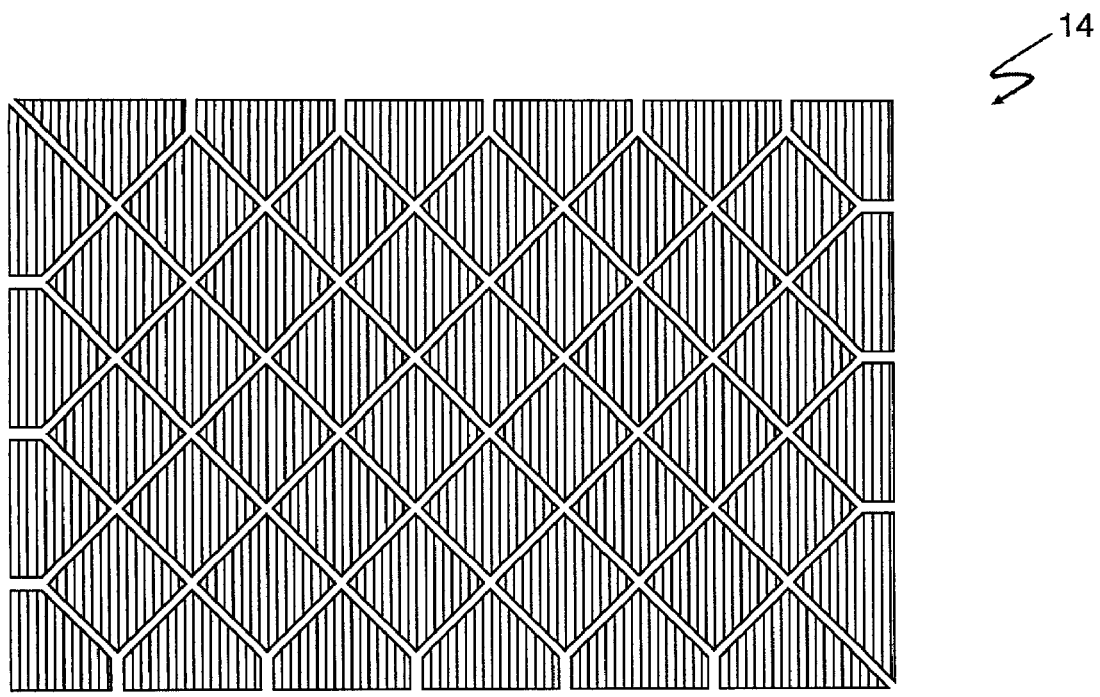
FIGS. 6, 7, and 8 illustrates an arrangement of pixels for each of the colors green, red, and blue, respectively.
Figure 7:
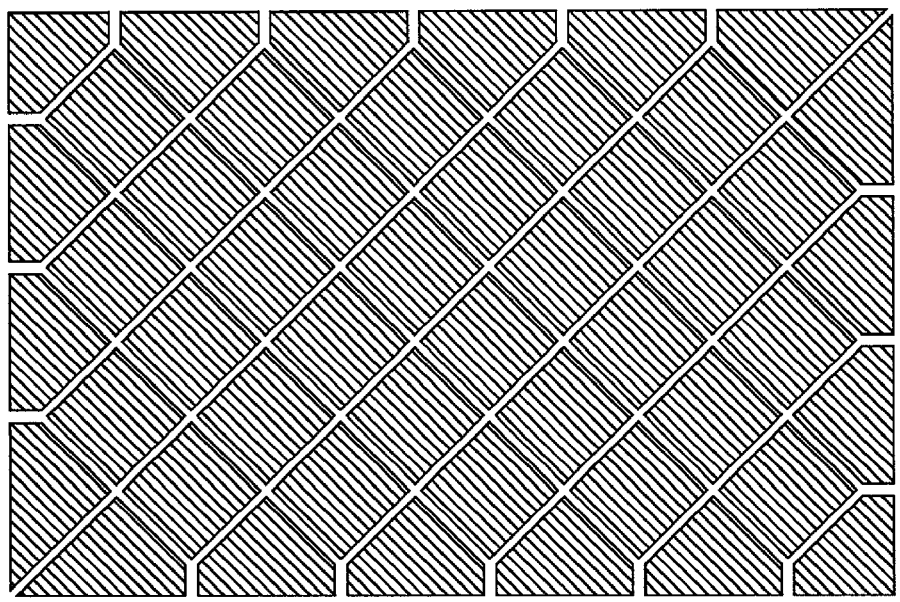
Figure 8:
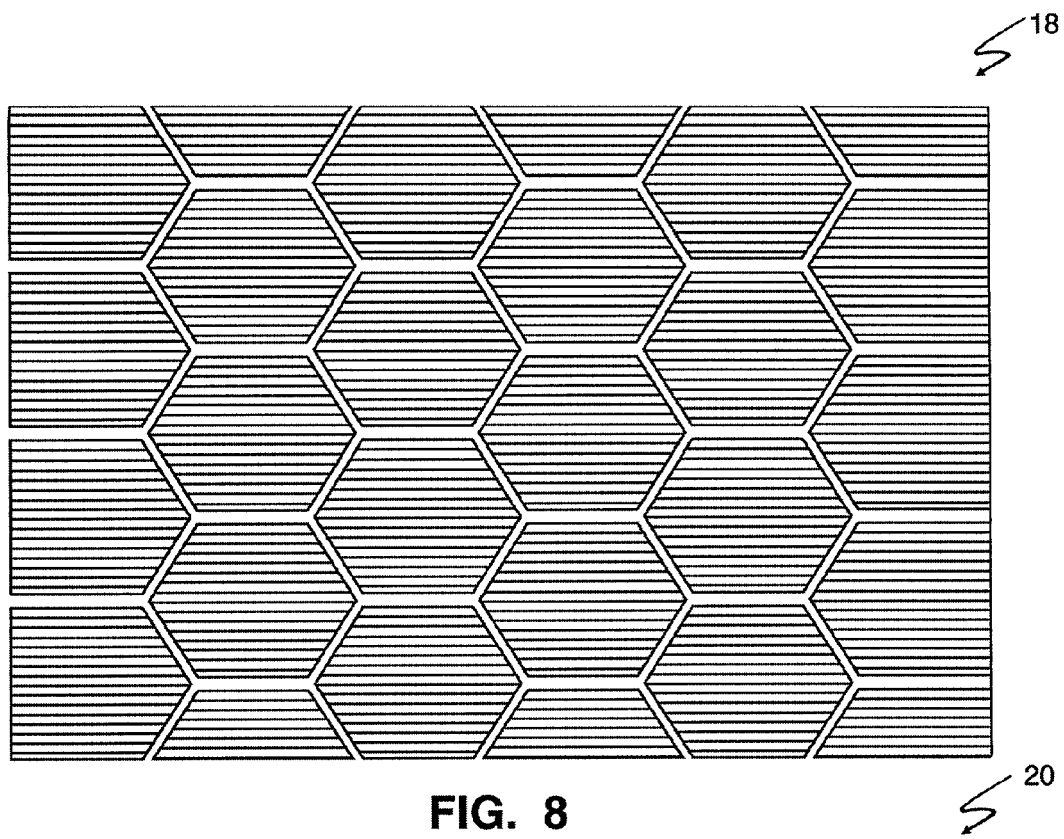

FIGS. 6, 7, and 8 are illustrations of an arrangement of pixel images for each color of green, red, and blue, respectively, for projectors. The same FIGS. 6, 7, and 8 are also illustrations of an arrangement of subpixels for each color of magenta, cyan, and yellow, respectively, for subtractive color flat panel displays. Magenta is equivalent to subtracting green from white. Cyan is equivalent to subtracting red from white. While yellow is equivalent to subtracting blue from white. For example, a multispectral light source is illuminated, illuminating panels of magenta, cyan, and yellow that are offset from one another in x and y by substantially less than 100%. In the following discussions regarding the theory of operation of the arrangement of subpixel elements, the additive color projector is used as an example. However, for subtractive flat panel display, the same theory of operation applies if one applies additive to subtractive color transforms well known in the art.

Figure 9:
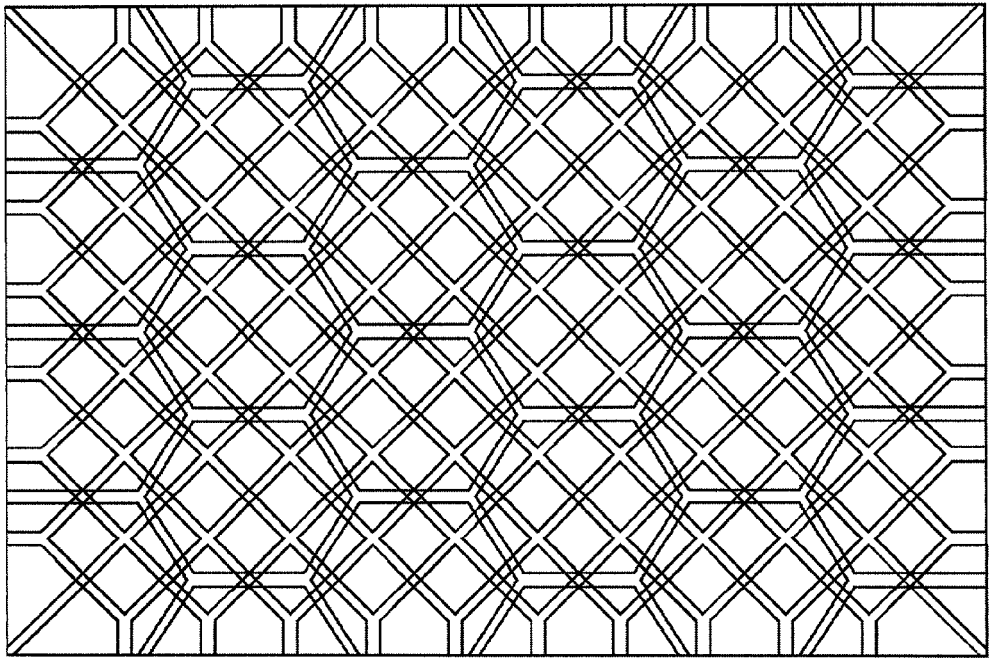
FIG. 9 illustrates the arrangements of FIGS. 6, 7, and 8 overlaid on one another to show how a full color image is constructed.
Figure 10:
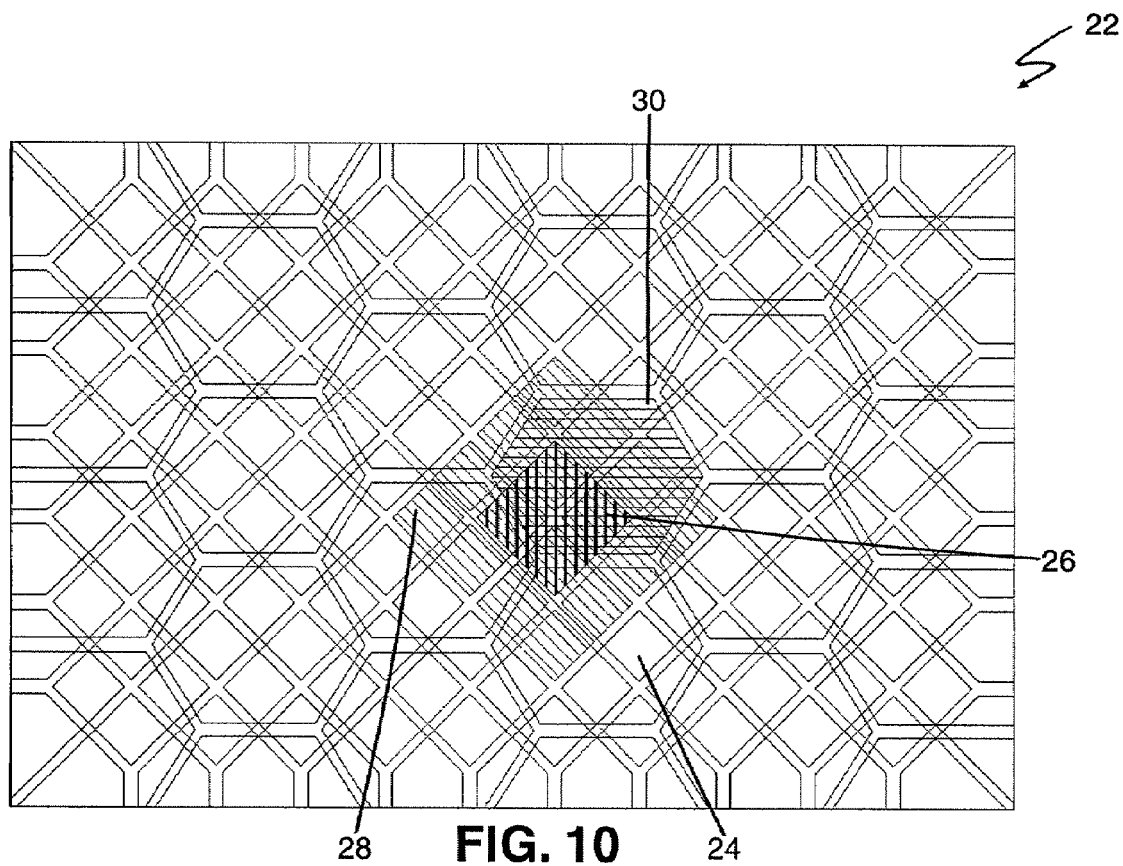

FIG. 9 illustrates the resulting multipixel image 20 of overlaying the images 14, 16, and 18 of FIGS. 6, 7, and 8, respectively, for a three-color plane projector or subtractive flat panel display. The resulting multipixel image 20 of FIG. 9 has the same number of logical pixels 24 as illustrated in FIG. 10 and the same addressability and MTF as the image formed by the arrangement of prior art FIG. 5. However, the same image quality is achieved with only 123 color elements, less than half of the number required by the prior art arrangement illustrated in FIG. 5. As the costs increase with the number of elements, the reduction in the number of elements offers the same image quality at a significantly lower cost, significantly higher image quality at the same cost, or a higher image quality at lower cost, when compared to the prior art arrangement illustrated in FIG. 5.

In each of the imaging devices discussed above, the beams (or panels) are convergent by substantially less than about 100%, with less than about 75% preferred, and with about 50% more preferred. In one embodiment, the geometric center of each of the beams (or panels) can lie along a locus of points describing a monotonic function. A monotonic function is always strictly increasing or strictly decreasing, but never both. In its simplest form, the monotonic function can be a straight line.

One advantage of the three-color plane array is improved resolution of color displays. This occurs since only the red and green pixels (or emitters) contribute significantly to the perception of high resolution in the luminance channel. Offsetting the pixels allows higher perceived resolution in the luminance channel. The blue pixel can be reduced without affecting the perceived resolution. Thus, reducing the number of blue pixels reduces costs by more closely matching human vision.

The multipixel image 22 of FIG. 10 illustrates a logical pixel 24 showing a central pixel 26 of either the red or the green color plane (in this case it is green) that is set at 50% of the input value associated with that logical pixel 24. Surrounding and overlapping this central pixel 26 are four pixels 28 of the opposite color of the red/green opposition channel (in this case it is red) that is set at 12.5% of the input value associated with that logical pixel 24. Partially overlapping and offset is a blue pixel 30, that is set at about 25% of the input value associated with that logical pixel 24.

The logical pixel 24 of FIG. 10 illustrates that the central area defined by the central pixel 26 is the brightest area, at 31.25%, while the surrounding area, defined by the surrounding pixels 28 of the "opposite" color (not overlapping with the central pixel 24) remains at 6.25% brightness. This approximates a Gaussian spot, similar to those formed by the electron gun spot of a CRT.

Figure 13:
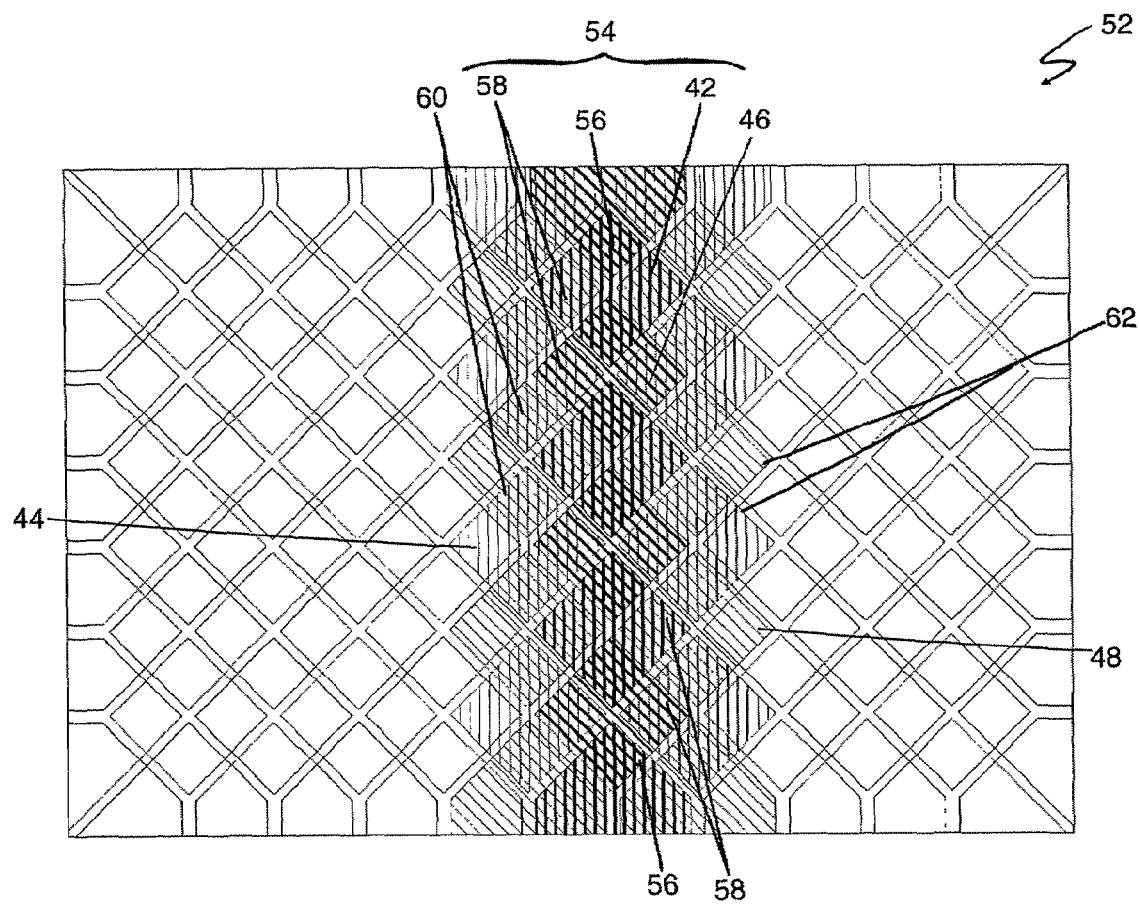
FIG. 13 illustrates the red and green image planes of FIGS. 11 and 12 overlaid.
Figure 16:
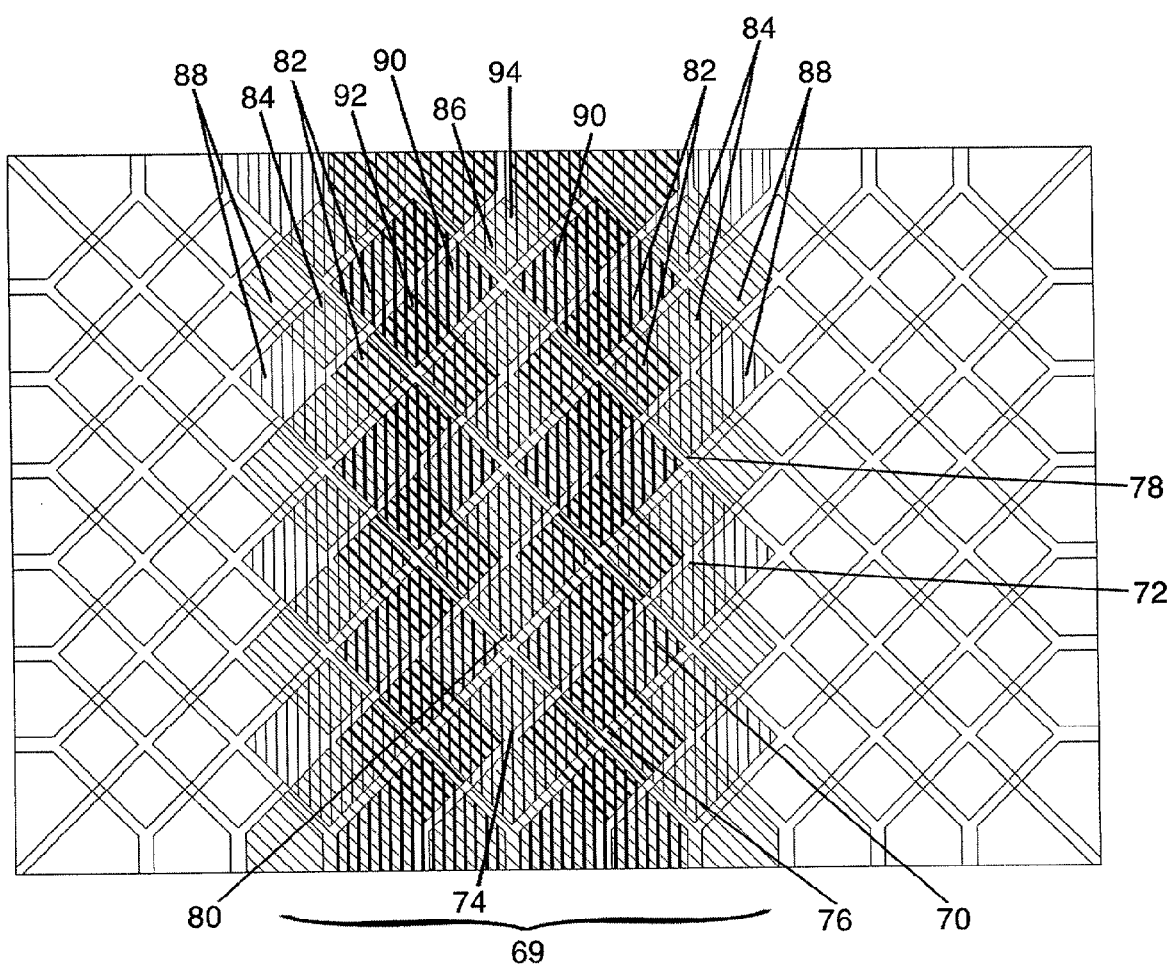
FIG. 16 illustrates the red and green image planes of FIGS. 14 and 15 overlaid.

Images 52 and 68 are built up by overlapping logical pixels as shown in FIGS. 13 and 16, respectively. For ease of illustration, the blue plane in each figure has not been shown for clarity. The algorithms used in calculating the values of the pixels in each color plane are disclosed in a provisional application submitted by the Applicant entitled, "CONVERSION OF RGB PIXEL FORMAT DATA TO PENTILE MATRIX PIXEL DATA FORMAT" (Ser. No. 60/290,086;), now U.S. Patent Publication No. 2003/

0034992, hereby incorporated by reference. The arrangement of the pixels of each color plane 14, 16, and 18 illustrated in FIGS. 6, 7, and 8, respectively, are essentially identical to some of the effective sample area arrangements found in the above-referenced provisional application. Thus, the techniques taught in the above-referenced provisional application disclosure are incorporated herein by reference. Further, the arrangement of this present application use the same reconstruction points of the pixel arrangements disclosed in the above-mentioned provisional application.

Figure 11:
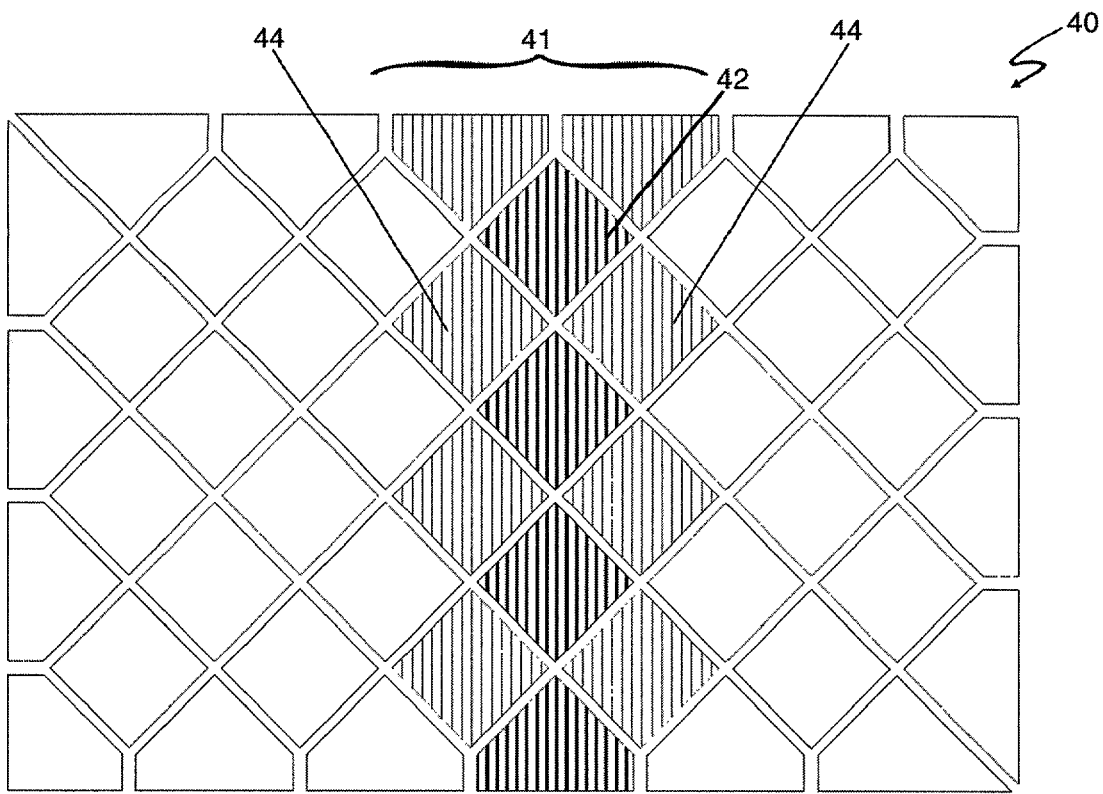
Figure 12:
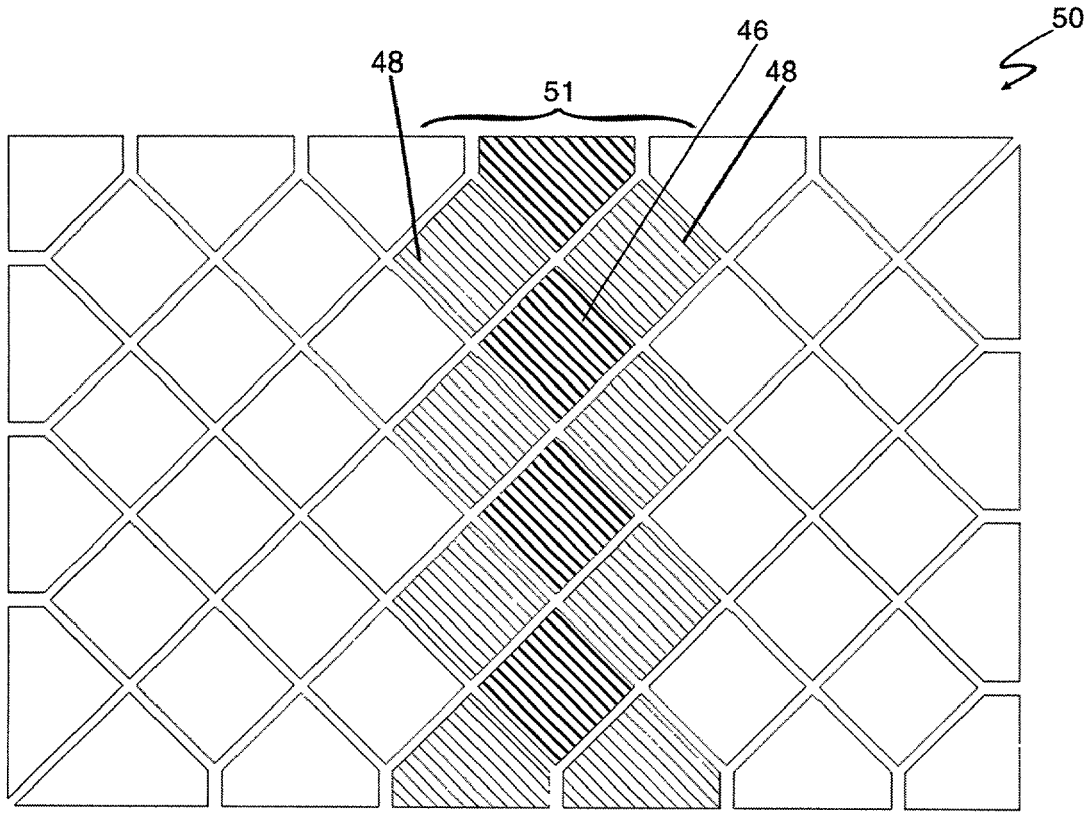

For projected image or subtractive color flat panel displays, the present application discloses using the same pixel rendering techniques and human vision optimized image reconstruction layout. However, a smoother image construction is created in the present application due to the overlapping nature of the pixels. For an example of a multipixel image 52 having the smoother image construction, FIG. 13 illustrates a vertical line 54 comprising the green component image 40 and the red component image 50 of FIGS. 11 and 12, respectively. As illustrated in the multipixel image 40 in FIG. 11, a vertical line 41 comprises central green pixels 42 and outer green pixels 44. As illustrated in the multipixel image 50 in FIG. 12, a vertical line 51 comprises central red pixels 46 and outer red pixels 48. For clarity, the blue color plane is not shown in FIG. 13. This example assumes that the vertical line 54 displayed at about 100% of the input value and is surrounded on both sides by a field at 0% of the input value.

FIG. 13 illustrates that the central red pixels 46 of the vertical line are offset from the central green pixels 42 when superimposed onto each other. These central pixels 42 and 46 are each set at 75%. The outer pixels 44 and 48 are each set at 12.5%. The areas of overlap of the central pixels 42 and 46 form a central series of smaller diamonds 56 that are at 75% brightness. The overlap of pixels 44 and pixels 46, and the overlap of pixels 48 and pixels 42, respectfully, form two series, just outside of the said central series, of smaller diamonds 58 that are at 43.75% brightness. The overlap of the outer pixels 44 and 48 form two series of smaller diamonds 60 that are at 12.5% brightness. While the areas of the outer pixels 44 and 48 that do not overlap form an outermost series of smaller diamonds 62 that are at 6.25% brightness. This series of brightness levels, 6.25%, 12.5%, 43.75%, 75%, 43.75%, 12.5%, and 6.25% exhibits a Gaussian distribution. Further, if one were to imagine an infinitely narrow vertical line segment, at least several pixels long, moving across the displayed vertical line 54, integrating the brightness, the resulting function would be a series of smooth segments joining the brightness levels, from zero to 75% to zero. Thus, the resulting cross-sectional brightness function, integrated over several pixels tall, along the displayed line, closely approximates a smooth Gaussian curve. This displayed vertical line can be moved over by about one-half pixel, such that the addressability would be about one-half pixel.

In moving the vertical line, the amount of improvement is proportional to the amount out of phase. Having the images out of phase at a value of substantially less than about 100% is preferred, with less than about 75% more preferred, and with the images being exactly out of phase by about one-half pixel, or about 50%, is ideal.

FIG. 16 illustrates a multipixel image 68 of two vertical lines 69 displayed to demonstrate that the MTF is about one-half of the addressability, which is the theoretical limit for subpixelated displays. FIG. 16 illustrates the two vertical lines 69 comprising the green component image 64 and the red component image 66 of FIGS. 14 and 15, respectively.

Figure 14:
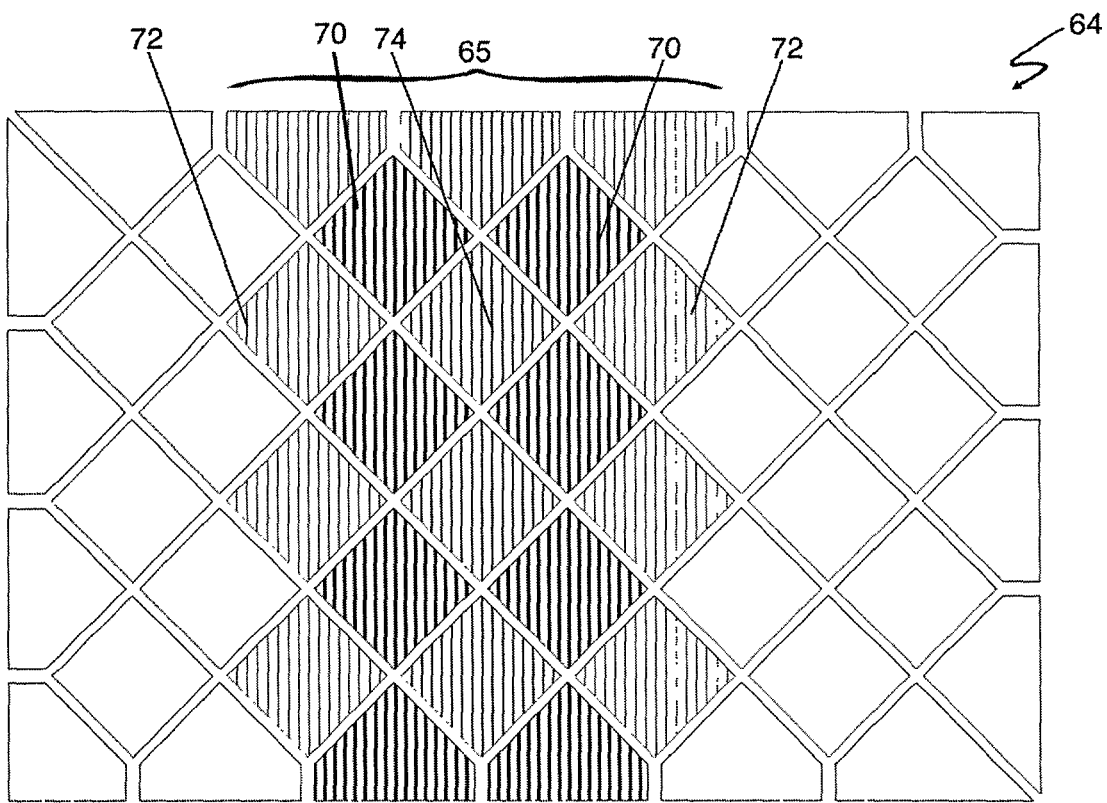
Figure 15:
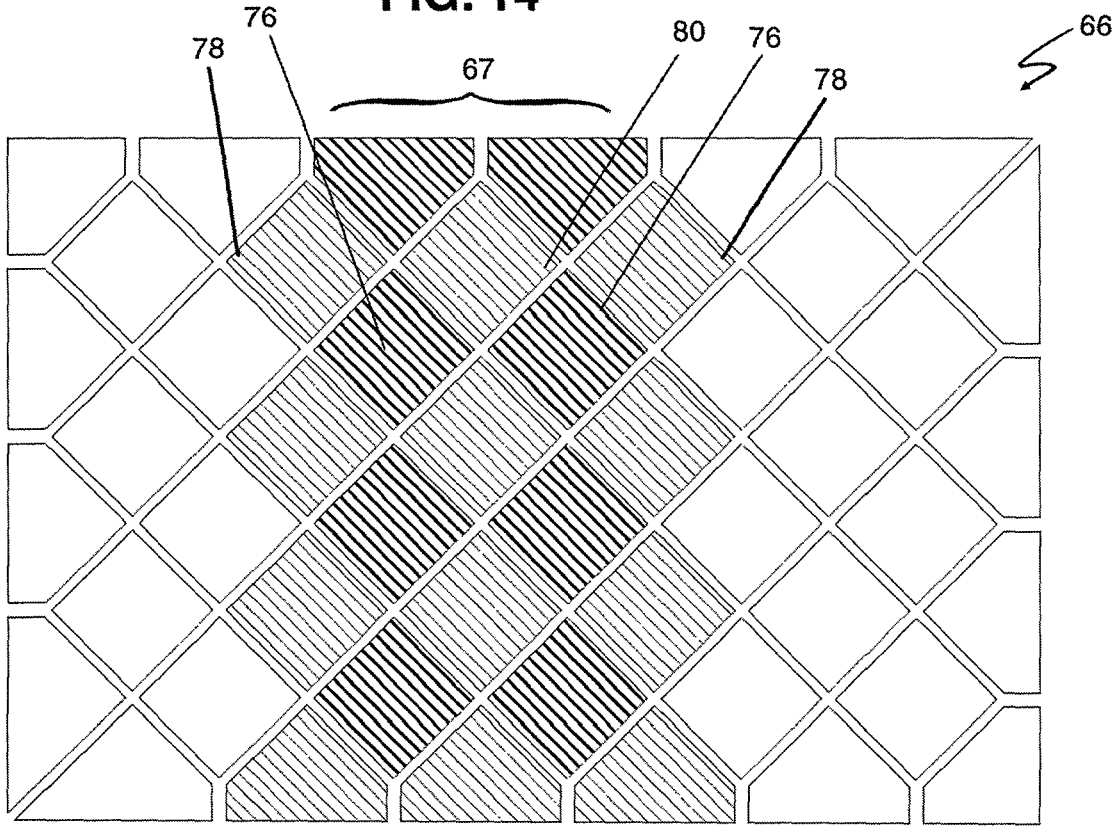

As illustrated in the multipixel image 64 in FIG. 14, the central green pixels 70 and outer green pixels 72 comprise two vertical lines 65. As illustrated in the multipixel image 66 in FIG. 15, the central red pixels 76 and outer red pixels 78 comprise two vertical lines 67. For clarity, the blue color plane is not shown in FIG. 16. This example assumes that the vertical line 69 is displayed at about 100% of the input value and is surrounded on both sides by a field at 0% of the input value.

The central red pixels 76 of the two vertical lines 69 are offset from the central green pixels 70 when superimposed as in FIG. 16. These central line pixels 70 and 76 are each set at 75%. The outer pixels 72 and 78 are each set at 12.5%. The pixels 74 and 80 between the two central lines of pixels 76 and 70 are set at 25%.

The outer edges, those not adjoining the other line, have the same sequence of brightness levels as described for the case of FIG. 13. That is, the areas of the outer pixels 72 and 78 that do not overlap form an outermost series of smaller diamonds 88 at 6.25% brightness. The overlap of the outer pixels 72 and 78 form two series of smaller diamonds 84 that are at 12.5% brightness. The overlap of pixels 72 and pixels 76, and the overlap of pixels 78 and pixels 70, respectfully, form two series, just outside of the central line series 86, of smaller diamonds 82 that are at 43.75% brightness. The areas of overlap of the central line pixels 70 and 76 form a central series of smaller diamonds 92 that are at 75% brightness.

The space between the two central vertical lines 69 has three series of smaller diamonds 90 and 94. The overlap of red central line pixels 76 and green interstitial pixels 74, and the overlap of green central line pixels 70 and red interstitial pixels 80, respectively, form a series of smaller diamonds 90 at 50% brightness. The overlap of interstitial pixels 74 and 80 form a series of smaller diamonds 94 at 25% brightness. Theoretically, this represents samples of a sine wave at the Nyquist limit, exactly in phase with the samples. However, when integrating over an imaginary vertical line segment as it moves across from peak to trough to peak, the function is that of a triangle wave. Yet, with the MTF of the projection lens limiting the bandpass of the projected image, the function is that of a smooth sine wave. The display effectively removes all Fourier wave components above the reconstruction point Nyquist limit. Note that the modulation depth is 50%. As long as this is within the human viewer's Contrast Sensitivity Function (CSF) for a given display's contrast and resolution, this modulation depth is visible.

Figure 17:
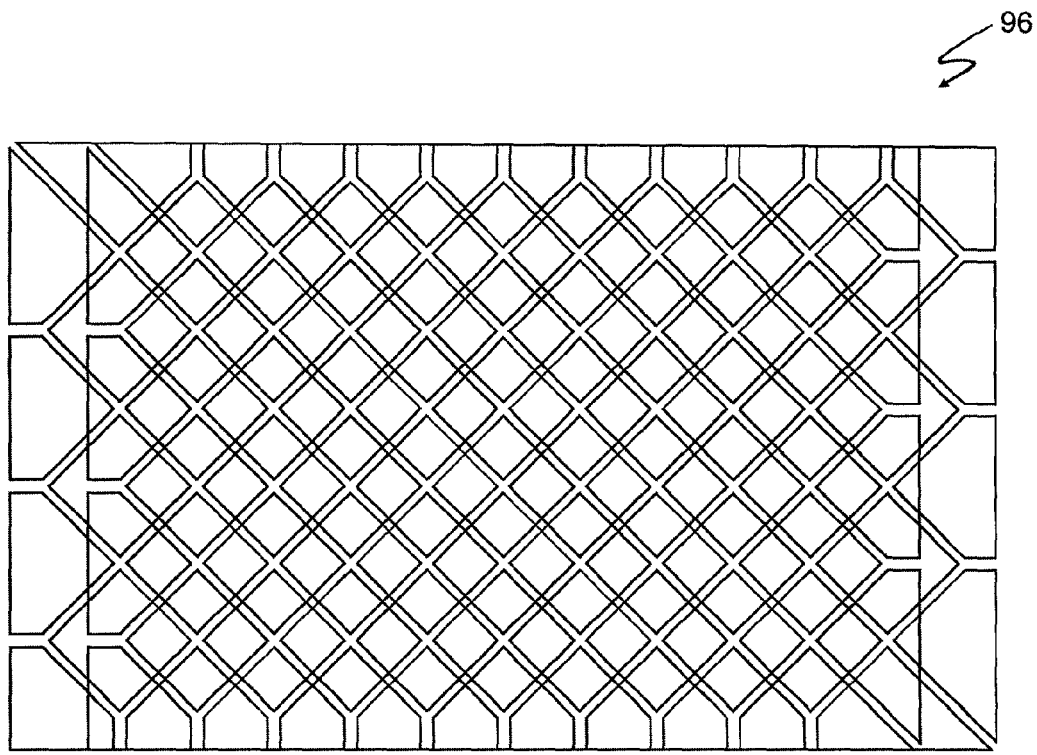
FIG. 17 illustrates two images of the pixel arrangement of FIG. 6 overlaid, offset by one-half pixel, to demonstrate how a single imaging plane can build up a higher resolution image using field sequential color, or to demonstrate how two imaging planes of a multi-panel may be offset to build up a higher resolution image.
Figure 18:
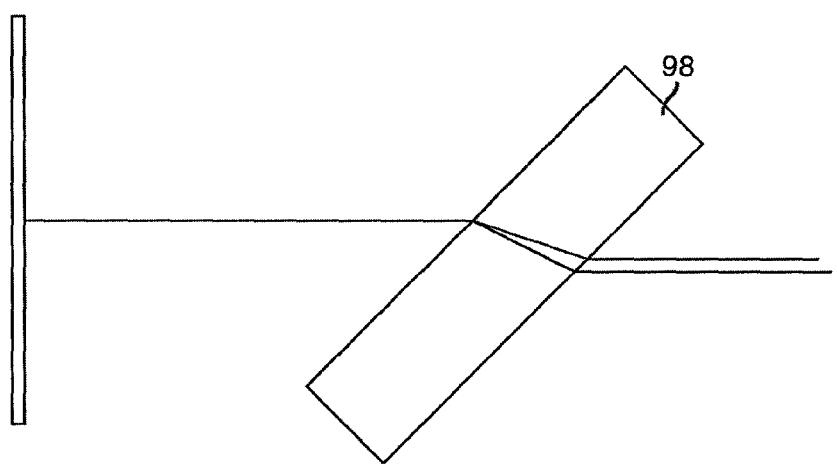
FIG. 18 illustrates splitting of an image path into two different paths for different colors through an inclined plate made of a chromodispersive material.

FIG. 17 illustrates an overlay 96 of the image 14 of FIG. 6 offset 50% with itself. This represents an alternative embodiment of a single panel projector, using field or frame sequential color that is well known in the art. In this embodiment, the array is again formed from diamonds, but the image 14 is shifted optically to separate the red and green color planes by about one-half pixel. This color shift may be accomplished as shown in FIG. 18 by an inclined plane lens 98 of a suitable chromodispersive transparent material. Such an arrangement will separate and differentially shift the red, green and blue images due to the different index of refraction for each wavelength. This lens element may be a separate flat plane lens, or may be an inclined curved element that is an integral part of the projection lens assembly. Such modifications to the lens assembly may be designed using techniques well known in the art.

Figure 19:
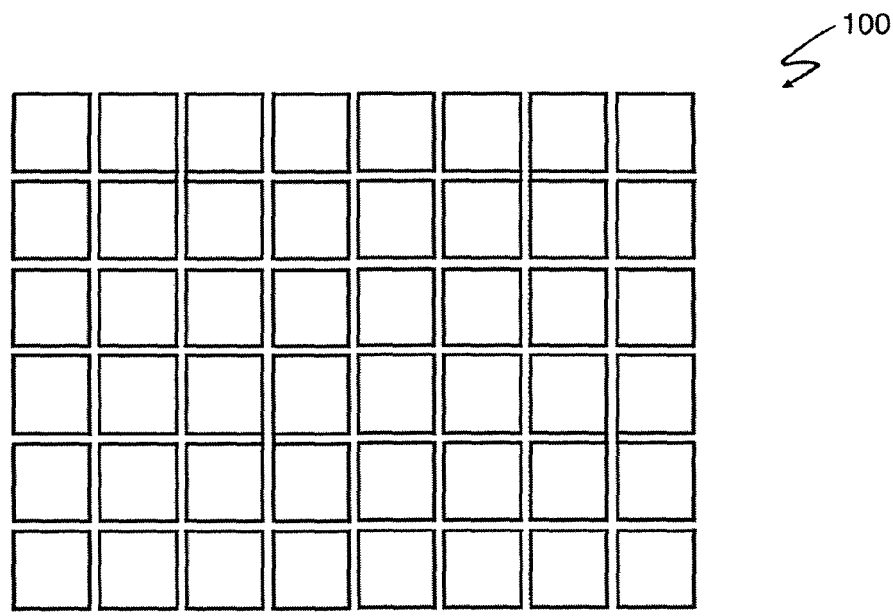
FIG. 19 illustrates a prior art arrangement of pixels.
Figure 20:
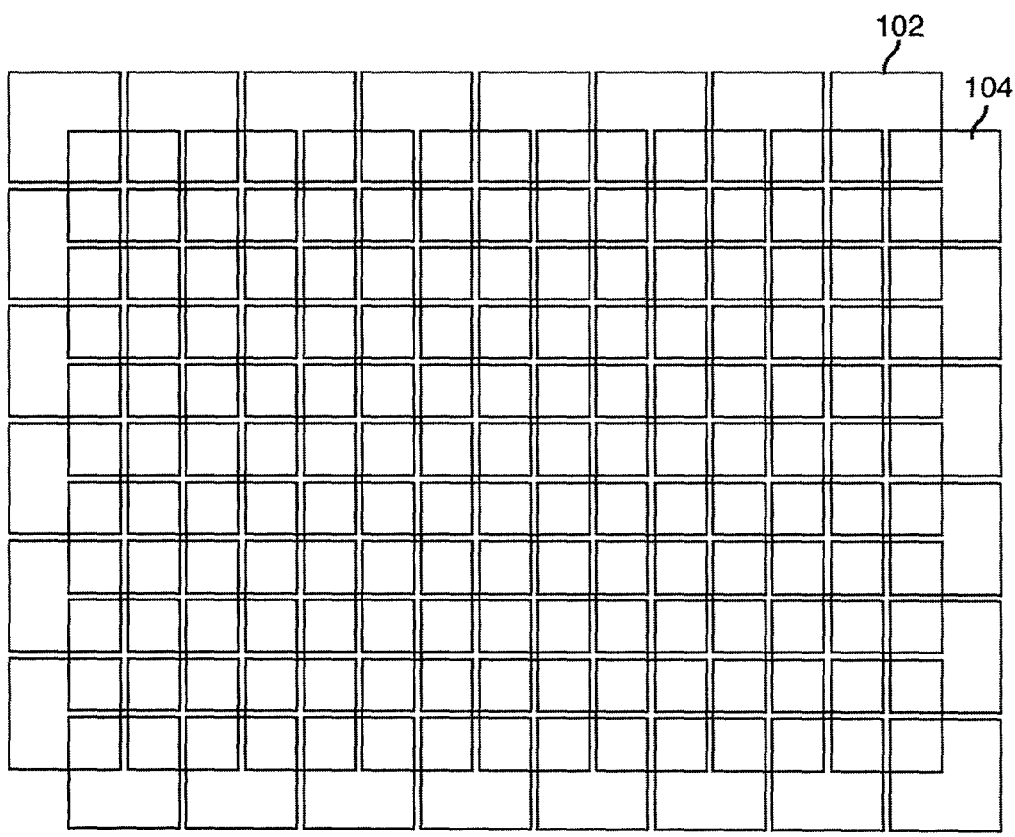
FIG. 20 illustrates an overlay of the arrangement of prior art FIG. 19 in which the two colors are offset by one-half pixel in the diagonal direction.
Figure 21:
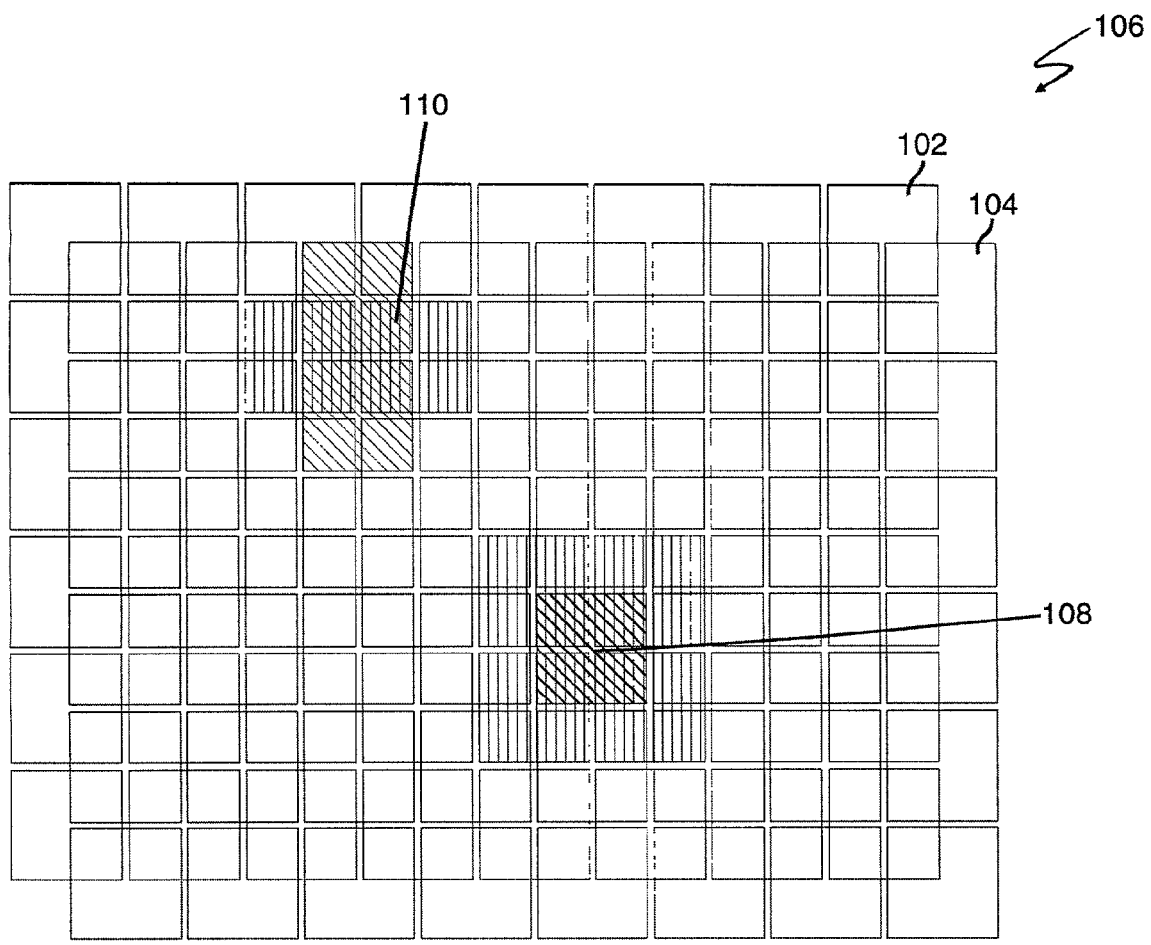
FIG. 21 illustrates the overlaid arrangement of FIG. 20 with two color logical pixels at different addressable points.
Figure 22:
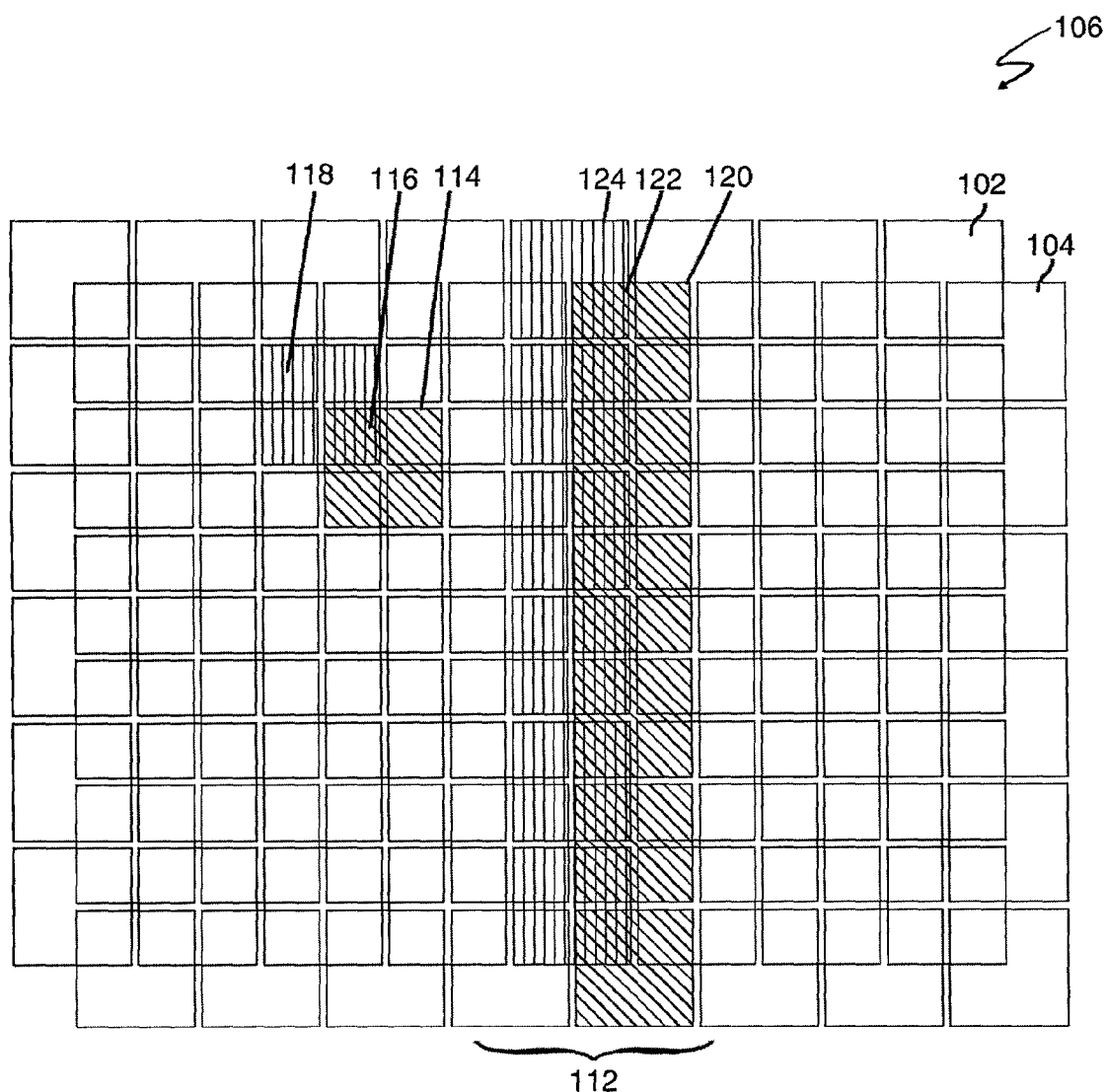
FIG. 22 illustrates the overlaid arrangement of FIG. 20 with an alternative color logical pixel and a column line of logical pixels.

These optical and mechanical means for shifting the color image planes can be used to improve display systems that use prior art arrangements 100 of pixels as illustrated in FIG. 19. The green image 102 may be shifted from the red image 104 by about one-half pixel in the diagonal direction as illustrated in the arrangement 106 in FIG. 20. This allows subpixel rendering to be applied to the resulting system. FIG. 21 illustrates two logical pixels centered on a square grid that lies on corner interstitial 108 and edge interstitial 110 points in the arrangement 106 of FIG. 20. FIG. 22 illustrates arrangement 106 with a logical pixel and a column line 112 of overlapping logical pixels centered on pixel quadrants defined by the pixel overlaps.

In examining the example of a logical pixel 114, 116, and 118 shown in FIG. 22, the output value of each pixel is determined by a simple displaced box filter in which four input pixels are averaged for each output pixel. Each input pixel uniquely maps to one red output pixel 114 and one green output pixel 118 that overlaps by one quadrant 116. Thus, the addressability of the display has been increased four fold, twice in each axis. With one input pixel at about 100% value surrounded by a field at 0% value, the red output pixel 114 and the green output pixel 118 are set at 25% output. The area of overlap 116 is at 25% brightness while the areas of the output pixels 114 and 118 not overlapping are at 12.5% brightness. Thus, the peak brightness is in the overlapping quadrant.

In examining the vertical line 112 displayed in FIG. 22, it is displaying a line at about 100% input value surrounded on both sides by a field at 0% input value. The overlapping logical pixels are additive. Thus, the red output pixels 120 and the green output pixels 124 are set at 50%. The area of overlap 122 is at 50% brightness while the areas of the output pixels 120 and 124 that are not overlapping are at 25% brightness. Thus, the area of peak brightness corresponds with location of the displayed line 112.

In examining and evaluating the display system, it can be noted that while the addressability of the display has been doubled in each axis, the MTF has been increased by a lesser degree. The highest spatial frequency that may be displayed on the modified system is about one-half octave higher than the prior art system. Thus, the system may display 2.25 times more information on four times as many addressable points.

In the above systems the blue information has been ignored for clarity. This is possible due to the poor blue resolving power of human vision. However, in so far as the blue filter or other blue illumination system is less than perfect and allows green light that will be sensed by the green sensing cones of human vision, the blue image will be sensed by the green cones and add to the perception of brightness in the luminance channel. This may be used as an advantage by keeping the blue pixels in registration with the red pixels to add to the red brightness and to offset the slight brightness advantage that green light has in the luminance channel. Thus, the red output pixels may be, in fact, a magenta color to achieve this balance of brightness.

Figure 23:
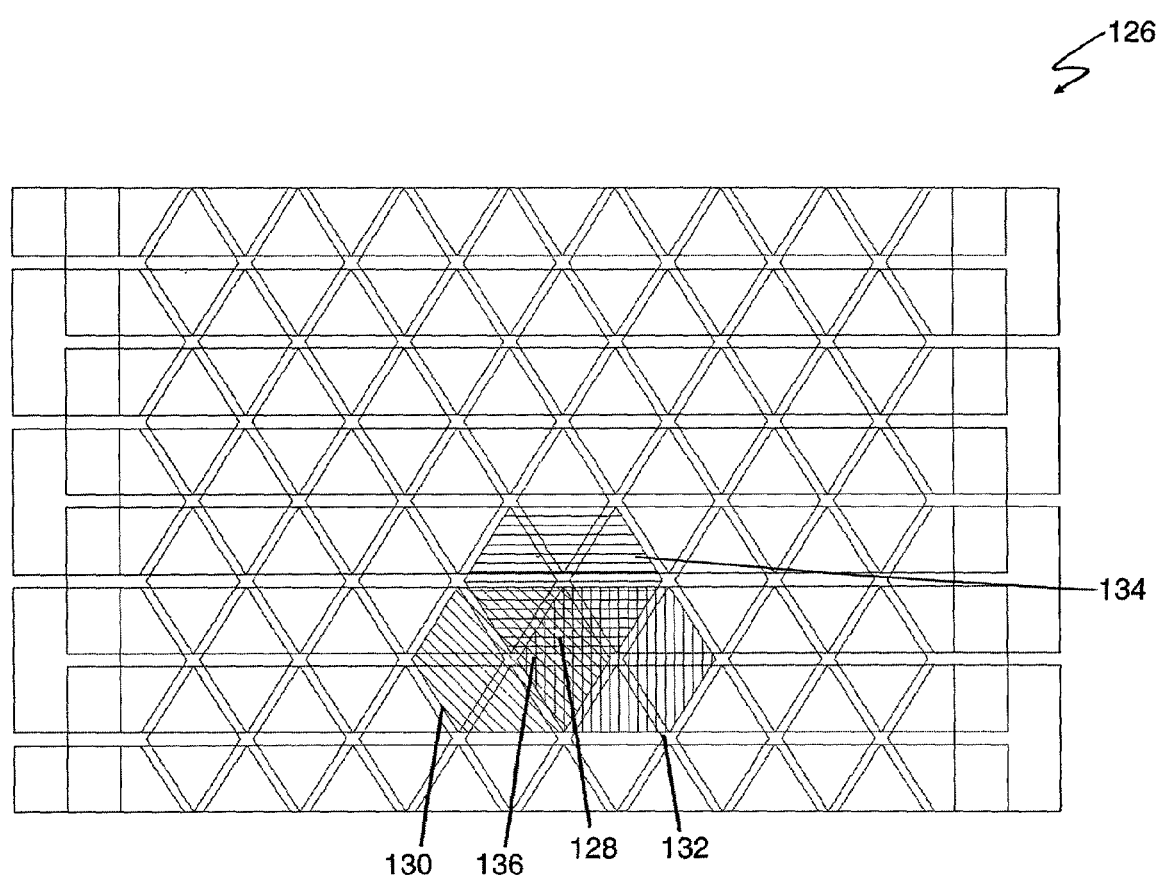

If a system were designed in which the "blue" image has significant leakage of green, and possibly yellow or even red, the "blue" image may be used to further increase the effective resolution of a display. The "blue" color may be closer to a pale pastel blue, a cyan, a purple, or even a magenta color. An example of such a display 126 is illustrated in FIG. 23. FIG. 23 illustrates three images of the array of pixels shown in FIG. 8 overlaid with a shift of one third of a pixel each. A logical pixel 128 is illustrated on the resulting image 126 in FIG. 23. The red pixel 130, green pixel 132, and "blue" pixel 134 overlap to form a smaller triangular area 136 that is at the center of the logical pixel. This overlap area is brightest, followed by the three areas where there are only two pixels overlapping, while the areas with no overlap have the lowest brightness. The manner of calculating the values of the pixels follows in a similar manner as outlined above.

Any system that traditionally uses converged, overlapped color pixels can take advantage of the concepts taught herein. For example, a color CRT display used for computer monitor, video, or television display may also be improved by shifting the color components and applying appropriate subpixel rendering algorithms and filters. A simple and effective change for computer monitors is to shift the green electron spot as described above for FIG. 22. This deliberate misconvergence will seem counter-intuitive to those most knowledgeable in the CRT art, but the resulting improvement will be as described above.

The displacement of the multi-color display imaging planes by a percentage of a pixel creates a display of higher resolution images by increasing the addressability of the system. Additionally, the MTF is increased to better match the design to human vision. A projector system using three separate panels can be optimized to better match the human vision system with respect to each of the primary colors. These results can be achieved in a single panel, field sequential color projector using an inclined plane chromodispersive lens element.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of doubling the addressability and increasing the modulation transfer function of a display displaying images as a plurality of red pixels, green pixels and blue pixels comprising:
    offsetting said green pixels from said red pixels and said blue pixels by at least one-half of the dimension of one of said red pixels in at least a first direction; and
    subpixel rendering input image data into output image data is displayed as a set of logical pixels upon said display; wherein the display is a projector and said offsetting is composed optically.

2. The method of claim 1, wherein the display is a projector and said offsetting is completed mechanically.

3. The method of claim 1, wherein the display is a cathode ray tube video display and said offsetting is completed electrostatically.

4. The method of claim 1, wherein the display is a cathode ray tube video display and said offsetting is completed magnetically.

5. A method of doubling the addressability and increasing the modulation transfer function of a display displaying images as a plurality of red pixels, green pixels and blue pixels, comprising:
    offsetting said red pixels, said green pixels and said blue pixels by at least one third of the dimension of one of said pixels in at least a first direction; and
    subpixel rendering input image data into output image data such output image data is displayed as a set of logical pixels upon said display, wherein the display is a projector and said offsetting is completed optically.

6. The method of claim 5, wherein the display is a projector and said offsetting is completed mechanically.

7. The method of claim 5, wherein the display is a cathode ray tube video display and said offsetting is completed electrostatically.

8. The method of claim 5, wherein the display is a cathode ray tube video display and said offsetting is completed magnetically.

9. A method for forming a multipixel image on an imaging surface, comprising:
   projecting for each pixel in said multipixel image a plurality of monochrome beams of different colors towards said imaging surface; and
   directing each of said plurality of monochrome beams for each said pixel along a beam path towards said imaging surface, wherein images formed on said imaging surface from each said beam are convergent by substantially less than about 100% of spatial convergence such that the number of independently addressable elements are increased; and
   subpixel rendering input image data into output image data such that output image data is displayed as a set of logical pixels upon said display, wherein plurality of monochrome beams are light beams; and wherein said imaging surface is a projection screen.

10. The method of claim 9, wherein said monochrome beams are convergent by less than about 75% of spatial convergence.

11. The method of claim 9, wherein said monochrome beams are convergent by about 50% of spatial convergence.

12. The method of claim 9, wherein directing each of said plurality of monochrome light beams is performed using optical elements.

13. The method of claim 9, wherein said directing each of said plurality of monochrome light beams further placing an inclined plane lens in said beam paths.

14. The method of claim 13, wherein said inclined plane lens comprises a chromodispersive transparent material.

15. The method of claim 9, wherein a geometric center of each said monochrome beam lies along a locus of points describing a monotonic function.

16. A method for forming a multipixel image on an imaging surface, comprising:
   projecting for each pixel in said multipixel image a plurality of electron beams exciting phosphors of different colors towards said imaging surface; and
   directing each of said plurality of monochrome beams for each said pixel along a beam path towards said imaging surface, wherein images formed on said imaging surface from each said beam are convergent by substantially less than about 100% of spatial convergence and
   subpixel rendering input image data such that output image data is displayed as a set of logical pixels upon said display, wherein a geometric center of each said electron beam lies along a locus of points describing a monotonic function.

17. The method of claim 16, wherein directing each of said plurality of electron beams is performed using electrostatic deflection.

18. The method of claim 16, wherein directing each of said plurality of electron beams is performed using magnetic deflection.

19. The method of claim 16, wherein said plurality of electron beams comprises a beam exciting substantially red emitting phosphors, a beam exciting substantially green emitting phosphors, and a beam exciting substantially blue emitting phosphors.

20. A method for forming a multipixel image on an imaging surface, comprising:
   illuminating a multispectral light source;
   projecting light from said multispectral light source towards a first panel including an x by y matrix of a first color subtractive pixels, a second panel including an x by y matrix of a second color subtractive pixels, and a third panel including an x by y matrix of a third color subtractive pixels for each pixel in said multipixel image, said panels are convergent by substantially less than about 100% of spatial convergence; and directing each of said plurality of light beams for each said pixel along a path towards said imaging surface, wherein images formed on said imaging surface from each said light beam; and
   subpixel rendering input image data into output image data such that output image data is displayed as a set of logical pixels upon said display, wherein a geometric center of said first panel, said second panel, and said third panel lies along a locus of points describing a monotonic function.

21. The method of claim 20, wherein said first panel is substantially cyan in color, said second panel is substantially magenta in color, and said third panel is substantially yellow in color.

22. The method of claim 20, wherein said first panel, said second panel, and third panel are offset from one another in x and y by less than about 75% of spatial convergence.

23. The method of claim 20, wherein said first panel, said second panel, and third panel are offset from one another in x and y by about 50% of spatial convergence.

* * * * *